US011071915B2

(12) United States Patent
Black et al.

(10) Patent No.: US 11,071,915 B2
(45) Date of Patent: Jul. 27, 2021

(54) DELIVERY OF SPECTATOR FEEDBACK CONTENT TO VIRTUAL REALITY ENVIRONMENTS PROVIDED BY HEAD MOUNTED DISPLAY

(71) Applicant: Sony Interactive Entertainment Inc., Tokyo (JP)

(72) Inventors: Glenn T. Black, San Mateo, CA (US); Michael G. Taylor, San Mateo, CA (US); Todd Tokubo, San Mateo, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/428,133

(22) Filed: Feb. 8, 2017

(65) Prior Publication Data
US 2018/0093185 A1 Apr. 5, 2018

Related U.S. Application Data

(60) Provisional application No. 62/402,994, filed on Sep. 30, 2016.

(51) Int. Cl.
*A63F 13/00* (2014.01)
*A63F 13/537* (2014.01)
(Continued)

(52) U.S. Cl.
CPC .......... *A63F 13/537* (2014.09); *A63F 13/213* (2014.09); *A63F 13/26* (2014.09); *A63F 13/5372* (2014.09); *A63F 13/5375* (2014.09); *A63F 13/5378* (2014.09); *A63F 13/56* (2014.09); *A63F 13/58* (2014.09); *A63F 13/86* (2014.09); *G06F 3/011* (2013.01); *G06K 9/00315* (2013.01); *G06T 7/74* (2017.01);
(Continued)

(58) Field of Classification Search
CPC ......... G06F 3/013; G06F 3/0346; G06F 3/012
See application file for complete search history.

(56) References Cited

U.S. PATENT DOCUMENTS 6,409,599 B1 * 6/2002 Sprout ..................... A63F 13/08
463/31
9,244,533 B2 1/2016 Friend et al. .................. 715/863
(Continued)

OTHER PUBLICATIONS

ISR PCT/US2017/053339, dated Feb. 23, 2018, 1 page.
(Continued)

*Primary Examiner* — Omkar A Deodhar
*Assistant Examiner* — Eric M Thomas
(74) *Attorney, Agent, or Firm* — Penilla IP, APC

(57) ABSTRACT

Systems and methods for processing operations for delivering spectator feedback content to a head mounted display (HMD) of an HMD user are provided. A computer-implemented method includes providing a VR scene to an HMD user and capturing images of one or more spectators usable to detect a presence and emotional state of the one or more spectators. The method also includes displaying within the VR scene of the HMD user one or more avatars representing the presence of the one or more spectators. Further, the method includes delivering an indication of the detected emotional state of the one or more spectators via the one or more avatars, respectively.

18 Claims, 16 Drawing Sheets

(51) Int. Cl.
    *A63F 13/58*        (2014.01)
    *A63F 13/5375*    (2014.01)
    *A63F 13/26*        (2014.01)
    *A63F 13/56*        (2014.01)
    *A63F 13/5372*    (2014.01)
    *A63F 13/213*      (2014.01)
    *A63F 13/5378*    (2014.01)
    *A63F 13/86*        (2014.01)
    *G06T 7/73*         (2017.01)
    *G06F 3/01*         (2006.01)
    *G06K 9/00*         (2006.01)
    *G06T 11/60*       (2006.01)
    *G10L 17/22*       (2013.01)

(52) U.S. Cl.
    CPC .............. *G06T 11/60* (2013.01); *G10L 17/22* (2013.01); *A63F 2300/8082* (2013.01); *G06T 2207/30196* (2013.01)

(56) References Cited

U.S. PATENT DOCUMENTS

| | | | |
|---|---|---|---|
| 2011/0154266 A1 | 6/2011 | Friend et al. | 715/863 |
| 2013/0083008 A1 | 4/2013 | Geisner et al. | |
| 2013/0083173 A1* | 4/2013 | Geisner | G06F 3/013 348/51 |
| 2014/0221866 A1* | 8/2014 | Quy | H04W 4/21 600/544 |
| 2014/0274564 A1* | 9/2014 | Greenbaum | A63B 24/0087 482/5 |
| 2015/0030305 A1 | 1/2015 | Moon | |
| 2015/0301592 A1* | 10/2015 | Miller | G06F 3/016 345/156 |
| 2016/0026253 A1* | 1/2016 | Bradski | H04N 13/344 345/8 |

OTHER PUBLICATIONS

Japanese Application No. 2019-512636, Notification of Reason(s) for Refusal, English translation, Dispatch No. 201703, dated Jun. 2, 2020.

* cited by examiner

DELIVERY OF SPECTATOR FEEDBACK CONTENT TO VIRTUAL REALITY ENVIRONMENTS PROVIDED BY HEAD MOUNTED DISPLAY

CLAIM OF PRIORITY

This application claims priority to U.S. Provisional Patent Application No. 62/402,994, filed on Sep. 30, 2016, entitled "Delivery of Spectator Feedback Content to Virtual Reality Environment Provided by Head Mounted Display," which is herein incorporated by reference.

FIELD OF THE DISCLOSURE

The present disclosure relates to delivering spectator feedback content (SFC) to an HMD of an HMD user being provided with a VR environment or scene. More particularly, embodiments of the present disclosure relate to methods and systems for obtaining information on who a spectator is, where the spectator is located, what emotional state the spectator is expressing, how long the spectator has been waiting for a turn, and what the spectator is communicating to the HMD user, and delivering said information to the VR environment or scene via the HMD of the HMD user.

BACKGROUND

Virtual reality (VR) scenes provided by head mounted displays (HMDs) are becoming a more and more popular medium for consumers to interact with content. While part of the allure of VR is its ability to virtually transport a user into an environment detached from his or her real world surroundings, there are many circumstances in which detachment from the real world becomes a detriment to the VR experience. This is especially the case in social situations where one or more spectators are watching a user interact with a VR scene.

For example, when an HMD user is interacting with a VR scene, he may wish to receive feedback from one or more spectators looking on. In a most basic sense, the HMD user may wish to know if there are any spectators watching him or not, and if so, who and where they are. Moreover, the HMD user may also want to know how each spectator is doing. For example, the HMD user might wonder whether the spectators are having a good time as they watch on or not. A more enriching experience may be provided to the HMD user if feedback content from the audience of spectators is delivered to him. Feedback content may include cheering, encouragement, suggestions, hacks, and even trash-talking. Additionally, the HMD user may also wish to know if a spectator is not enjoying themselves and why.

Thus, the benefits of receiving spectator feedback in the context of an HMD experience is not so different from other social turn-based endeavors such as playing golf, going bowling, playing a board game, or playing an arcade game. The case of an HMD experience is unique, however, because the HMD user is isolated and detached from their spectators. As a result, the HMD user is typically unaware of states of the audience. There is both need and opportunity to enhance the VR and HMD user experience by delivering spectator feedback to the HMD user. Likewise, there is both a need and opportunity to enhance a spectator experience by allowing a channel for communicating feedback to the HMD user he is spectating.

It is in this context that embodiments of the disclosure arise.

SUMMARY

Embodiments of the present disclosure provide methods and systems for delivering spectator feedback content (SFC) to a VR scene of an HMD user (or simply, 'user'), and more particularly for obtaining data on a state of one or more spectators and delivering a representation of said state to the VR scene to apprise the HMD user of how the one or more spectators are doing. The method and system also define embodiments for the one or more spectators to actively communicate with the HMD user by obtaining audio data from a social virtual reality interactive space and delivering a representation of said communication to the VR scene of the HMD user. It should be appreciated that the present disclosure can be implemented in numerous ways, such as a process, an apparatus, a system, a device or a method on a computer readable medium. Several inventive embodiments of the present disclosure are described below.

In one embodiment, a computer-implemented method includes processing operations for delivering spectator feedback content to a head mounted display (HMD) of an HMD user. The method includes providing a VR scene to the HMD of the HMD user, and capturing images of the one or more spectators. The images are usable to detect a presence of one or more spectators and emotional states of the one or more spectators. The method further includes displaying within the VR scene one or more avatars, the one or more avatars representing the presence of the one or more spectators. The method also includes an operation of delivering an indication of the detected emotional state of the one or more spectators via the one or more avatars, respectively.

In another embodiment, the a computer-implemented method is described for processing operations for delivering information on a positional state of one or more spectators within a real world setting to a head mounted display (HMD) of an HMD user. The method includes providing a VR scene to the HMD of the HMD user. The method also includes an operation for obtaining positional data on the one or more spectators, the positional data usable to determine a location of the one or more spectators relative to the HMD user in the real world setting. Additionally, the method includes an operation for displaying an overhead view including an indication of the location of the one or more spectators relative to the HMD. In one embodiment described, the overhead view is a bird's-eye-view.

Another embodiment that is described includes a computer-implemented method for processing operations for delivering information on a positional state of one or more spectators within a real world setting to an HMD of an HMD user. The method includes providing a VR scene to the HMD of the HMD user and obtaining positional on one or more spectators wherein the positional data is usable to determine a location of the one or more spectators relative to the HMD user in the real world setting. The method also includes determining, based on the positional data, that a personal space of a spectator is being encroached. Further, the method includes displaying within the VR scene a representation of the spectator whose personal space is being encroached.

Other aspects of the disclosure will become apparent from the following detailed description, taken in conjunction with the accompanying drawings, illustrating by way of example the principles of the invention.

BRIEF DESCRIPTION OF THE DRAWINGS

The disclosure may best be understood by reference to the following description taken in conjunction with the accompanying drawings in which:

FIG. 5 shows an overall flow of a method for delivering SFC to an HMD user that includes a position of one or more spectators and for alerting the HMD user that a spectator's personal space is being encroached on.

FIG. 6 shows a flow of a method for delivering SFC to an HMD user, the SFC including an augmented view containing a virtual representation of a spectator whose personal space is being encroached on.

FIGS. 14A-14F show embodiments of delivering SFC to an HMD user with respect to a spectator's personal space being encroached on.

FIGS. 15A-15d show additional embodiments for delivering SFC an HMD user with respect to a spectator's personal space being encroached on.

DETAILED DESCRIPTION

Figure 1:
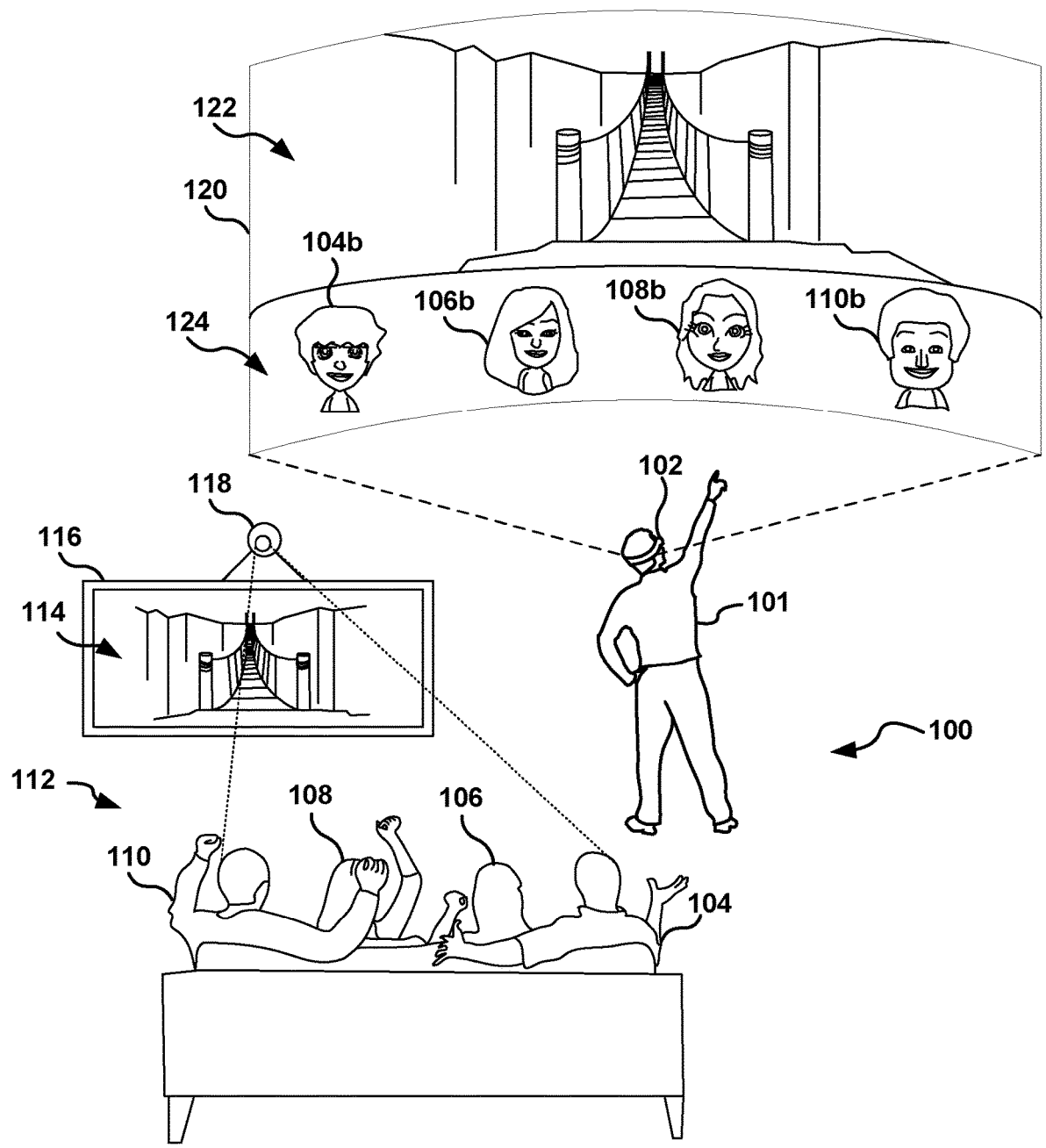
FIG. 1 shows an embodiment of a social virtual reality interactive space where an HMD user is interacting with VR content while also being delivered social feedback content (SFC) on states of several spectators.

The following embodiments describe methods, computer programs, and apparatus for processing operations for delivering spectator feedback content (SFC) to a head mounted display (HMD) user while being presented a virtual reality (VR) scene. It will be obvious, however, to one skilled in the art, that the present disclosure may be practiced without some or all of these specific details. In other instances, well known process operations have not been described in detail in order not to unnecessarily obscure the present disclosure.

VR environments provided by HMDs are typically configured to by navigable by a single user at a time. Moreover, as HMDs are designed to provide an immersive auditory and visual experience, HMD users interacting with VR content are disconnected from their real world surroundings. This disconnect can be less than optimal in a many situations, for example, when a number of people are sharing or taking turns on a limited number of HMDs. In these social situations, not only is the HMD user unaware how the social group is doing, but the social group is likewise unaware of what the HMD user is experiencing.

To increase engagement of persons within the social group, the content of an HMD user's VR experience may be projected onto a social screen that is viewable by persons within a social VR interactive space in real-time. As a result, members of the social group may become spectators of the HMD user's VR experience, thereby increasing a level of user satisfaction with respect to both the HMD user (who may now share his progress with his friends) and spectators within the group (who may find enjoyment in watching their friend navigate a VR scene). Social screens have been described in the art and are used to enable a flow of communication and entertainment from HMD user to spectators.

However, even with the use of social screens, the HMD user is nevertheless prevented from being made aware of his audience's reactions and/or emotional states. For example, the HMD user may wish to receive feedback on his game play or in-game decisions. In other circumstances, the HMD user may wish to be informed of whether a spectator has grown restless or frustrated while waiting for a turn to play. Further still, if the HMD user unknowing encroaches on a personal space of a spectator by wandering too close to a spectator or pointing an imagined shooting object at a spectator, the user would want to know.

One method of providing the HMD user with information regarding spectators is to deliver spectator feedback content to a VR scene or environment of an HMD user. In these methods, the user may be apprised with spectator feedback in real-time while still being able to interact with VR content. In general, spectator feedback may include passive feedback and active feedback. Passive feedback of may include, for example, facial expressions, posture, gaze states, and other states of a spectator that he is not necessarily actively attempting to communicate. Active feedback, on the other hand, may include expressions and gestures that might carry some degree of intentionality. The method described herein is able to deliver both passive and active feedback, as both types of feedback are indicators of how an audience is doing and whether they are enjoying themselves.

According to one embodiment of the method, one or more cameras may capture images associated with an audience of spectators of an HMD user. A computing system, which is coupled to the HMD of the HMD user, may analyze the captured images and provide representations of spectators to be displayed within the VR scene experienced by the HMD user. As a result, the HMD user is provided with a view of his spectators, in real-time, while still being allowed continued access to VR content.

As used herein, the term 'computing system' refers to a system or VR system that processes and executes VR content to be displayed by an HMD. The computing system may be a separate unit connected to the HMD via wired or wireless channels. In other embodiments, the computing system may be housed or integrated into the HMD body.

Additional embodiments may be such that the computing system is both attachable to the HMD body and also removable for other uses. That is, the computing system may be in a form of a smart phone, a tablet, or other mobile computing device having a screen and one or more processors. In still other embodiments, the computing system may be connected to the HMD remotely over the internet, wherein the computing system is implemented on one or more remote servers, or distributed in any combination of the above implementations.

In general, the term 'VR system' is taken to mean at least a minimum set of components that allow for spectator feedback content (SFC) to be delivered to an HMD of an HMD user. For example, a VR system as used herein may comprise of at least one HMD, at least one computing system, and at least one spectator detection or capture device. Spectator capturing devices may include, by way of example, one or more cameras, microphones, hand held input devices, or other networked device such as a tablet or a controller.

As used herein, social VR interactive space refers to a real world setting in which an audience of one or more spectators may observe an HMD user interact with VR content first hand.

As used herein, spectator feedback content (SFC) refers to content derived from one or more spectators from a social VR interactive space. SFC may include, by way of example, information regarding who the spectators are, where they are located, how long they have been waiting for a turn, their emotional state, or verbal communications from spectators. SFC may also include digitally communicable expressions such as emojis, GIFs, images, Vines, animations, 'stickers,' 'snaps' (short video recordings), and other forms of digital communication. SFC is also taken to include feedback information regarding a spectator's location relative to the HMD user. Thus, spectator feedback content is taken to include any information that may be captured of a spectator located within a VR interactive space.

As used herein, a VR scene is taken to mean a visual and auditory output of a virtual reality capable device that includes virtual reality content.

In some embodiments of the method, SFC may take a form of a thumbnail within a VR scene or environment so as to not occupy a larger portion of the HMD user's field of view than necessary. Additionally, SFC may include spectator representations that may take one of many forms, such as for non-delimiting examples, an avatar resembling a spectator, a life-like representation of a spectator, a life-like representation of a spectator having a filter, a lens, or an effect for post-processing a captured live image of the spectator, a generic face having multiple possible states of expression, or a name of the spectator. The spectator representations may serve to inform an HMD user of who is present within an audience of spectators, as well as other states a spectator may have. According to some embodiments, an emotional state of a spectator is extracted from image data and mapped to that spectator's representation. In other embodiments, a state of impatience or urgency to have a turn at the HMD of a spectator may also be extracted from image data and/or a player timer module and mapped to the representation of the spectator.

In addition to providing visual information on a state of a spectator, some embodiments of the method may provide SFC that includes verbalizations from a spectator communicating with the HMD user. In these embodiments, one or more microphones are used to capture sound data from the real world setting and parse it into meaningful content. For example, a spectator may be able to communicate a suggestion to the HMD user by simply voicing the suggestion. The suggestion, once captured is then relayed to the HMD user either in text form or in an audible format or both. Generally speaking, HMDs usually have an audio output such as headphones, which can deliver verbal/audio SFC to the HMD user. Moreover, the method is configured to match the verbal feedback to the spectator who offered it, allowing the HMD user to receive feedback and to know whom it came from.

In other social situations, the HMD user may wish to be informed on a location of one or spectators within his proximity. For example, in some social settings (e.g. social VR interactive spaces), spectators may be moving about and continually entering and leaving a proximity of the HMD user. There an increased a likelihood that a personal space of a spectator will be encroached on in these social settings. Certain embodiments of the method may provide a view for tracking a spectator's location relative to the HMD user. Some embodiments of this location tracking view might be in the form of an overhead view such as a bird's-eye-view (BEV) or 'minimap.' These embodiments provide positional or overhead views of the HMD user's surroundings, including spectators and other objects within a proximity of the user. The HMD user, having a bird's-eye-view of spectator feedback content (BEV-SFC), may then concentrate on interacting with VR content without fear of running into someone or otherwise encroaching on someone's personal space.

Additional embodiments of the method include operations that record clips of VR scenes as an HMD user is interacting with said VR scene. The method is also able to record clips of the spectator's reaction while watching the HMD user interact with the VR scene. These clips may also be made shareable through the internet.

FIG. 1 shows an embodiment of a social VR interactive space 100 having an HMD user 101 being presented a VR display 120 via an HMD 102. The social VR interactive space 100 is also shown to include an audience 112 of spectators 104-110 watching HMD user 101 navigate the VR scene 122 via a social screen 114 displayed on a 2-dimensional display 116. Each of the spectators 104, 106, 108, and 110 are shown to be tracked via image capture device 118. Although only one image capture device 118 is shown, there may be any number of such devices located within the social VR interactive space 100. Image capture device 118 communicates with a computing system (not shown) that is either coupled to HMD 102 or housed within HMD 102. The VR display 120 is shown to have both a VR scene 122 and SFC 124. In the embodiment shown, SFC 124 includes avatars 104*b*, 106*b*, 108*b*, and 110*b* which correspond to spectators 104, 106, 108, and 110, respectively.

Although the social screen 114 is shown to include VR scene 122 but not SFC 124, the social screen 114 may also be configured to display SFC 124. In such embodiments, spectators 104-110 may be made aware of how they appear to HMD user 101. As noted earlier, although the embodiment shown includes avatars as representations of spectators 104-110, there are a number of other methods of representing said spectators to HMD user 101.

Figure 2:
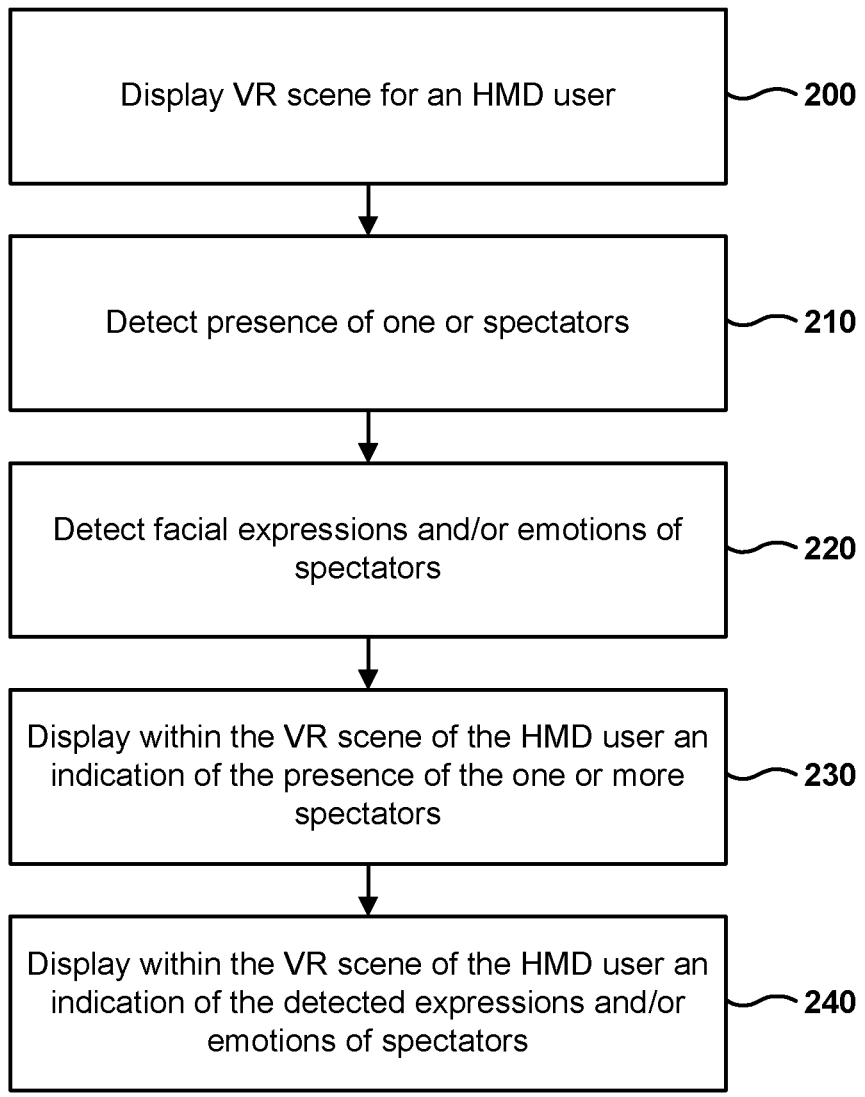
FIG. 2 illustrates an overall flow of a method for detecting the presence and emotional states of one or more spectators of an HMD user and delivering SFC including an indication of the same to the HMD user.

In FIG. 2, an embodiment of a method for delivering SFC to an HMD user is shown. Once operation 200 displays a VR scene to an HMD user, operation 210 detects presence of spectators. For example, this operation may use image capture and sound capture to identify that there are other persons within a proximity of the HMD user. If it is detected that there are spectators within the proximity, operation 220 may then detect facial expressions and/or emotions of the one or more spectators. Facial feature and expression detection technology is well understood in the art and will not be described in detail here.

The method then flows to operation 230, which displays within the VR scene of the HMD user an indication of the presence of the one or more spectators. As discussed above, an indication may take one of many forms, including virtual representations such as avatars or life-like projections of image capture data. For the sake of clarity and consistency, however, the term 'avatar' will be used to mean any indication or representation of a spectator within a VR scene of an HMD user. In most cases, each spectator is provided with his or her own individual avatar within the VR scene. The method then flows to operation 240, wherein an indication of each spectator's detected facial expression and/or emotions is displayed on each spectator's respective avatar. For example, if a spectator is happy and smiling, the method will display a respective avatar to be happy and smiling. As a result, the method enables the HMD user to be made aware of an emotional state of a spectator.

Generally speaking, while an emotional state is by definition a private subjective state, emotional states are generally accompanied by emotional cues or observable correlates when occurring in humans. As a result, the term emotional state as used herein to refer to an estimation of how a person is feeling based on behavioral data. Behavioral data may include any outwardly observable or measurable state in a person's facial expression, gaze, posture, vocalizations, or movement. Behavioral data may then be captured, tracked, and analyzed to estimate a likely correlating emotional state.

In certain other embodiments, indications of emotional states may be represented in a format that is not based on a virtual expression given by avatars. Instead, emotional states may be represented in terms of symbols, characters, words, color maps, or gauges.

Figure 3:
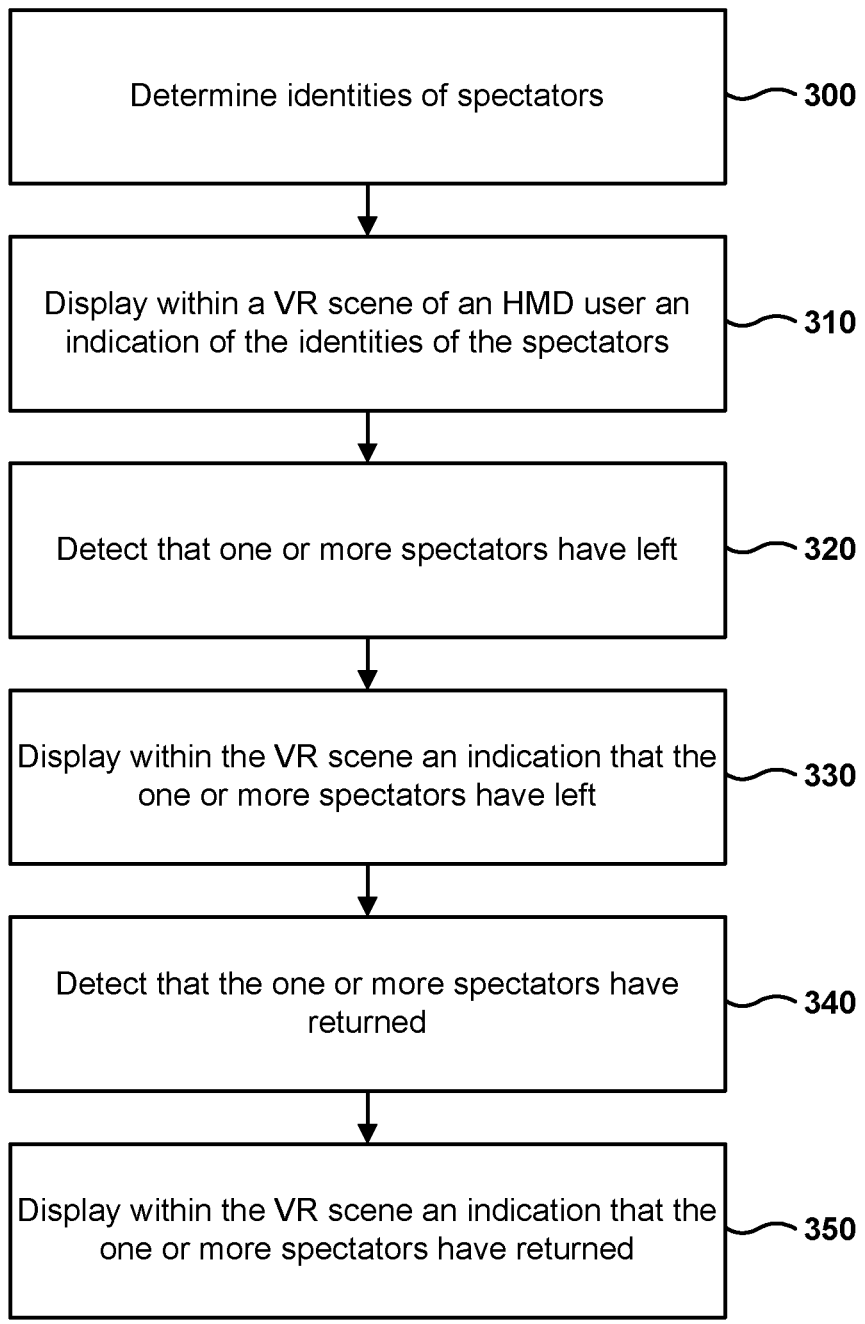
FIG. 3 shows an embodiment a method delivering SFC to an HMD user that a spectator has left and returned.

FIG. 3 shows an overall flow of a method for detecting that a spectator has left the social VR interactive space but later returns. In general, operation 300 determines identities of spectators through facial recognition methods that are well understood in the art. The method then flows to operation 310 wherein the identities of each spectator is displayed onto the VR scene being presented to an HMD user. Operation 320 is able to detect that one of the spectators has left the social VR interactive space and operation 330 indicates the same. In certain embodiments, the method recognizes which of the spectators has left and indicates so in the VR scene. For example, if LBJ happens to be one of the spectators identified in operation 300 of the method and he subsequently leaves the proximity, the method may indicate specifically that LBJ has left.

If LBJ returns to the social VR interactive space, the method is able to detect as his return in operation 340 and indicate the same in the VR scene of the HMD user in operation 350. If, instead, a spectator who is not LBJ enters the room, the method is able to recognize a difference between the two spectators and would display an indication that a new spectator has entered the proximity. Thus, the HMD user is made aware of who is within the social VR interactive space, giving him a better idea of his surroundings. In general, it may be the case that people are at greater ease when they are aware of who is in the same room as them. Informing the HMD user of others who are in the same room as he may therefore enhance his VR experience.

Figure 4:
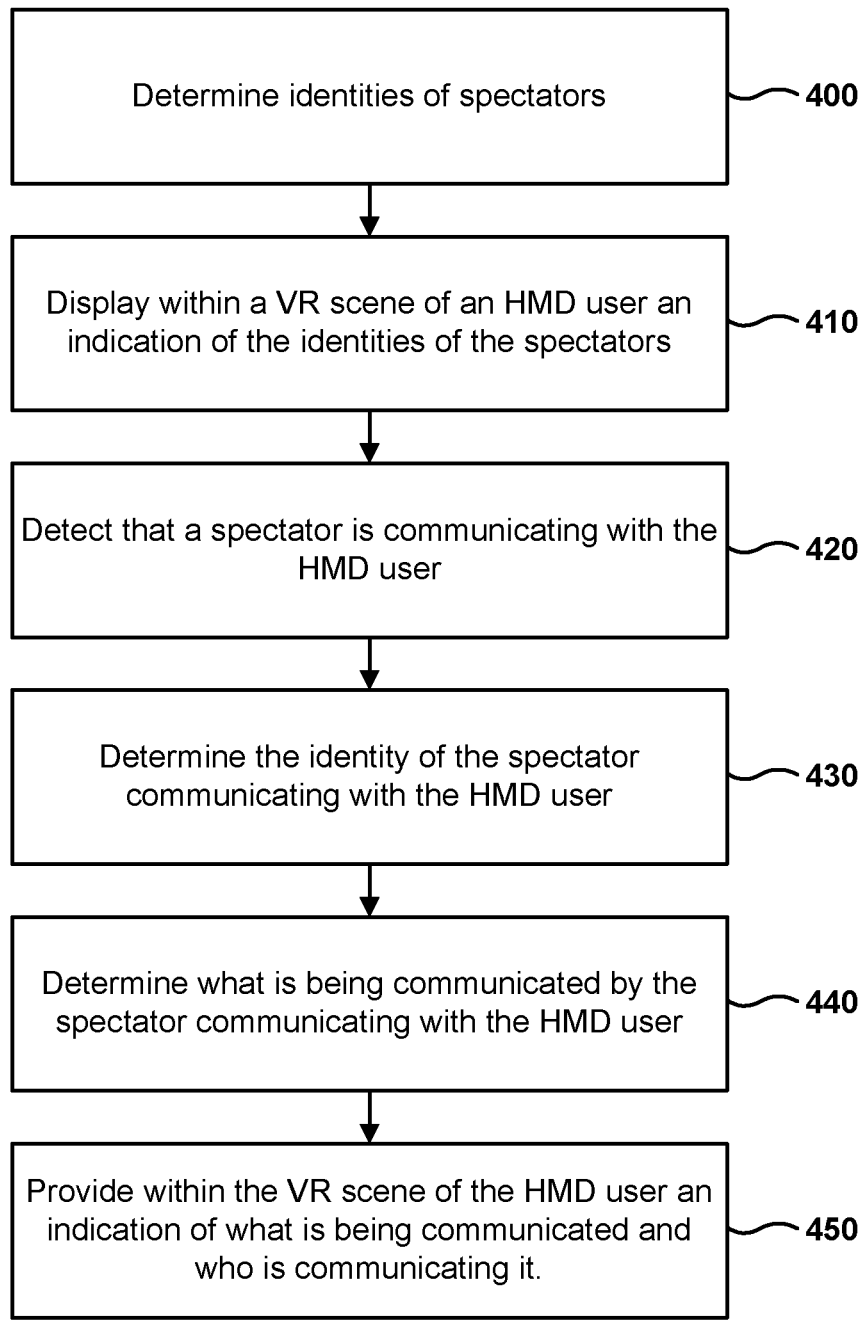
FIG. 4 shows an overall flow of a method delivering SFC to an HMD user, the SFC including a communication from a spectator.
Figure 5:
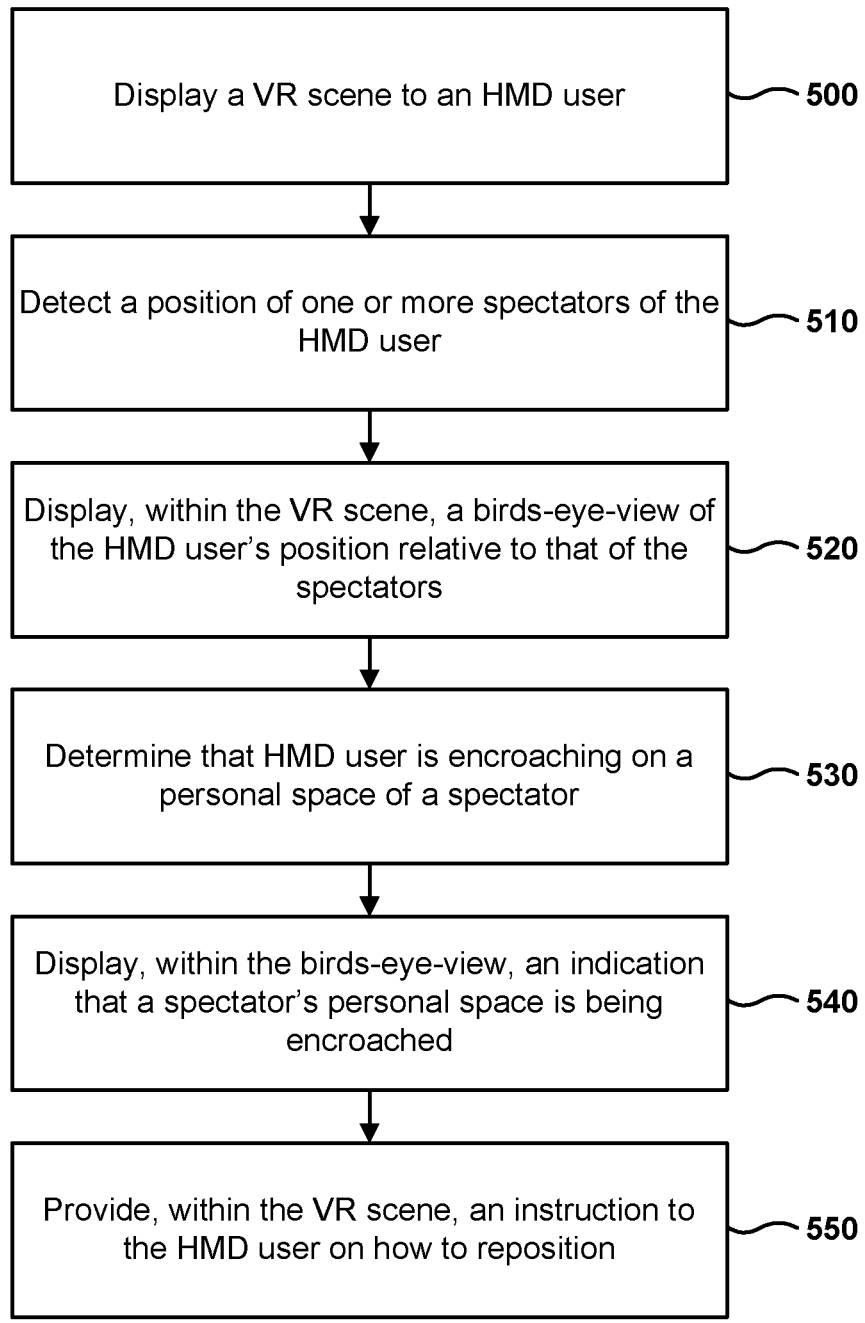

In FIG. 4, an overall method for delivering SFC in the form of verbal communication to the HMD user is provided. In operation 420, the method detects that a spectator is attempting to communicate with the HMD user. For example, a spectator LBJ may be asking the HMD user for a turn on the HMD (e.g., "Let me try!"). The method is then able to determine the identity of the HMD user attempting to communicate and what that user is communicating in operations 430 and 440, respectively. The method then flows to operation 450, wherein the VR scene is displayed with an indication of what is being communicated and who communicated it. In certain embodiments, a text transcription of the verbal communication is displayed within the VR scene. In other embodiments, the communication may be audible within the VR scene. Additionally, according to these embodiments, the communication is associated with the respective avatar so that the HMD user is aware of where the communication originated from.

FIG. 4 shows an overall method for delivering SFC, including information on spectator position and personal space to an HMD user. In operation 510, the method detects a position of one or more spectators. The method then flows to operation 520 wherein a birds-eye-view (or equivalent) of the HMD user's position relative to that of spectators may be displayed. According to certain embodiments, a birds-eye-view is a third-party view from above that is able to show the position of spectators relative to the HMD user. The birds-eye-view is a virtual representation of relative location calculated from image and sound data. That is, since in most circumstances there is not an actual camera having a bird's-eye-view of the social VR interactive space, the view may instead be generated from image capture data and sound capture data.

According to certain embodiments, a bird's-eye-view of the VR interactive space is able to alert the HMD user that he is encroaching on a spectator's personal space. Operation 530 is configured to detect if encroachment is occurring and operation 540 may then indicate so in the birds-eye-view within the HMD's VR scene to alert the HMD user. For some embodiments, the method may provide a graphic or animation on the birds-eye-view demonstrating whose personal space is being encroached on or about to be encroached on. The graphic may be a flashing animation like a sonar 'ping,' or other noticeable visual element. The indication may vary with the degree to which a spectator's personal space is being encroached. For example, in some embodiments, the alert may grow in size and/or brightness as the HMD user continues moves further into a spectator's personal.

In other embodiments, a user may engaged with the VR content to an extent that a more intense alert may be used to direct his or her attention to an event of personal space encroachment. For example, in some instances, the HMD of the HMD user may be provided with an interruption to the VR content, a vibrational alert, a view of the real world setting superimposed onto the VR content, audible alerts, or audible, textual, or visual instructions or any combination thereof for exiting a personal space of a spectator. In these embodiments, the instructions enable the HMD user to reposition or reorient him or herself to refrain from encroaching on the personal space of the spectator.

In further embodiments, a spectator whose personal space is being encroached may have an image captured of him that is to be displayed within the VR scene of the HMD. By delivering an image of the spectator whose space is being encroached, the HMD user may be made aware of said spectator's position and disposition, according to some embodiments.

Figure 6:
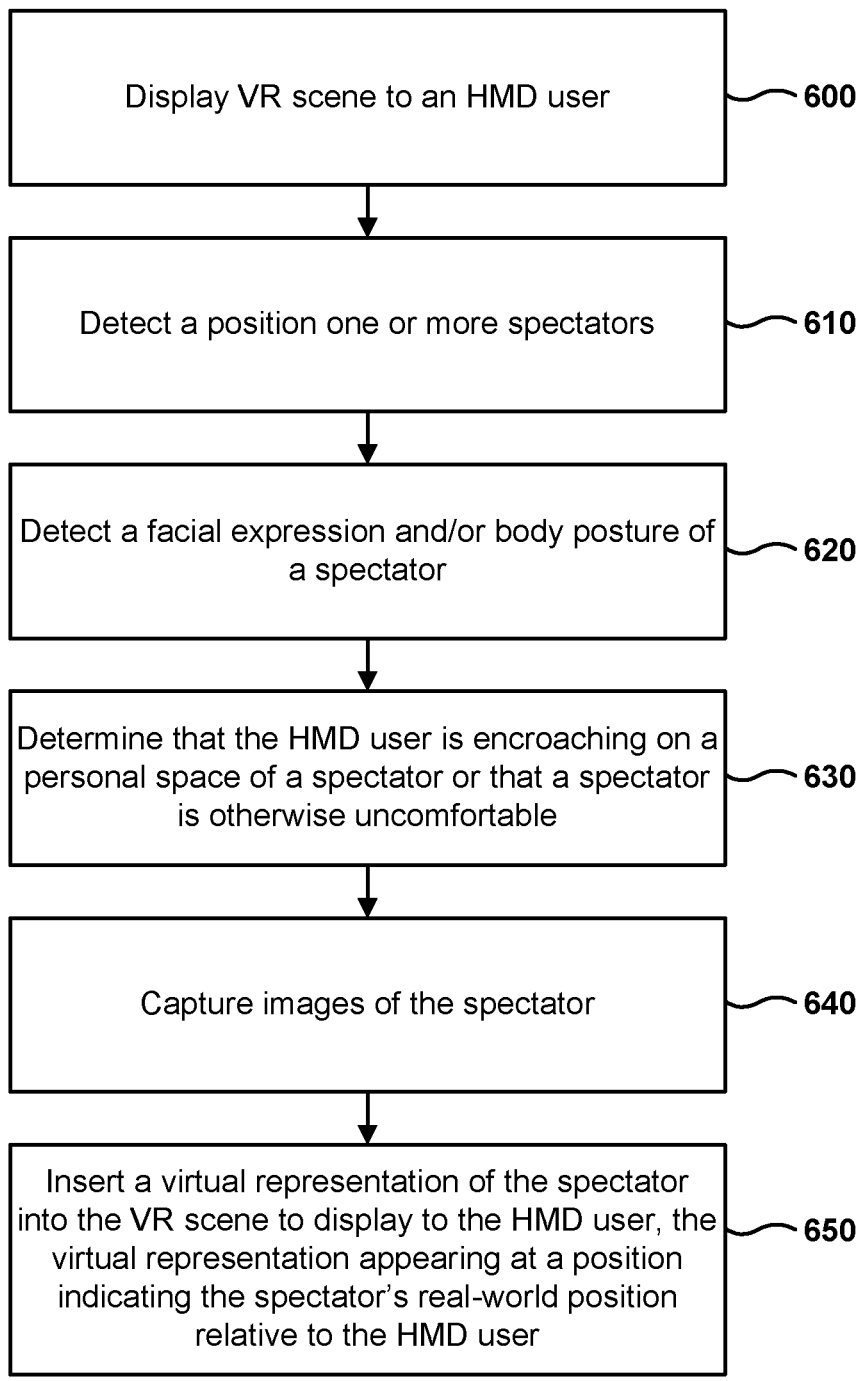

A method that is able to deliver an image of a spectator whose space is being encroached to a VR scene of an HMD is shown in FIG. 6. For example, operations 610 and 620 detect a position and a facial expression of a spectator, respectively. The method then flows to operation 630 which determines that the HMD user is encroaching on a personal space of a spectator or that a spectator is uncomfortable due to the HMD user's actions. In operation 640, the method is able to capture images of the spectator whose personal space is being encroached. In some embodiments, images may be captured by cameras located on or around the HMD, for example, and elsewhere in the social VR interactive space.

The method then flows to operation 650 wherein a virtual representation of the spectator may be inserted into the VR scene to be displayed to the HMD user. In general, the method displays the representation of the spectator at a display location within the VR scene that corresponds to the spectator's real-world position relative to the HMD user. In this manner, the HMD user is made aware of the spectator's location.

It should be noted that although steps of the method of FIG. 6 are presented in an exemplary order, the precise order of each of the steps may be modified or performed in parallel without departing from the scope and spirit of the embodiments. As a result, the order of the steps shown in FIG. 6 should not be construed as limiting.

Figure 7:
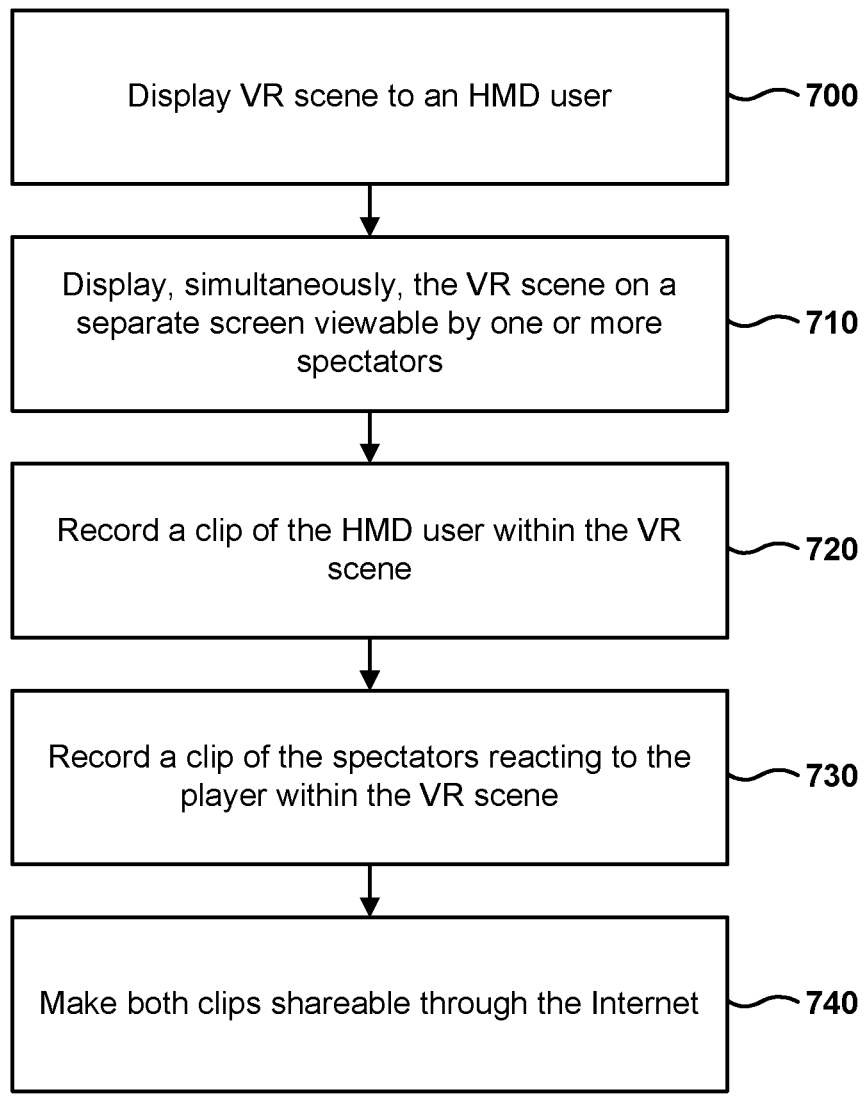
FIG. 7 shows a flow of a method for recording and sharing a clip of a VR scene of an HMD user and spectator reaction to the VR scene.

FIG. 7 shows an overall flow of a method for recording a playback clip of a VR scene being navigated by an HMD user. Operation 710, for example, is able to display a VR scene being navigated by an HMD on a secondary screen (social screen) viewable by one or more spectators. The method then flows to operation 720, which records a playback clip of the VR scene being navigated by an HMD user. As operation 720 is recording the VR scene, operation 730 records a clip of the spectators reacting to what they see on the social screen. In so doing, a segment of VR content is matched with audience reaction to the segment, according to certain embodiments. In operation 740, the method allows for the playback clip and the audience reaction to be made shareable through the internet.

Figure 8A:
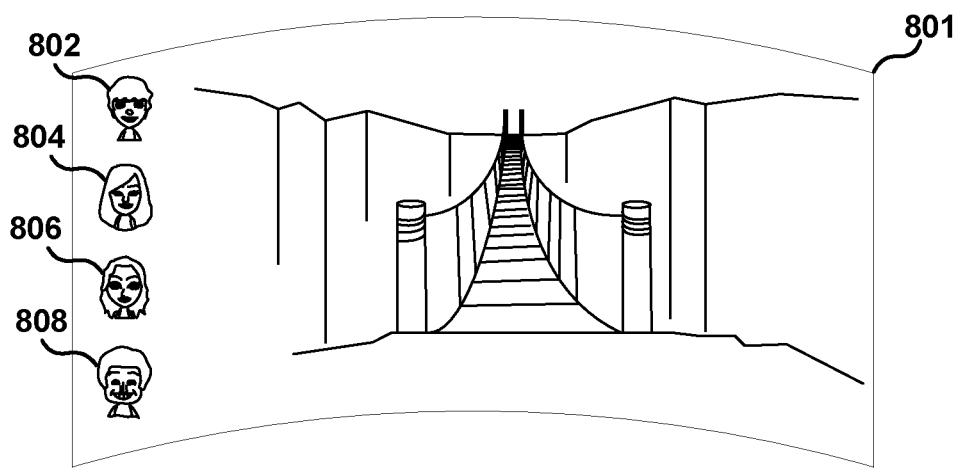
FIGS. 8A-8C show several embodiments of delivering SFC to VR scenes from a perspective of the HMD user.
Figure 8B:
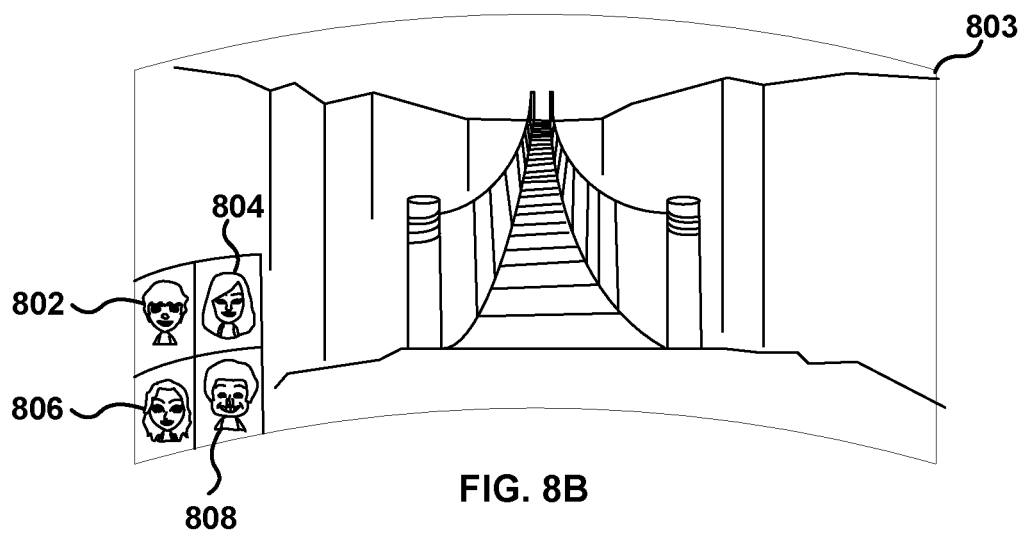
Figure 8C:
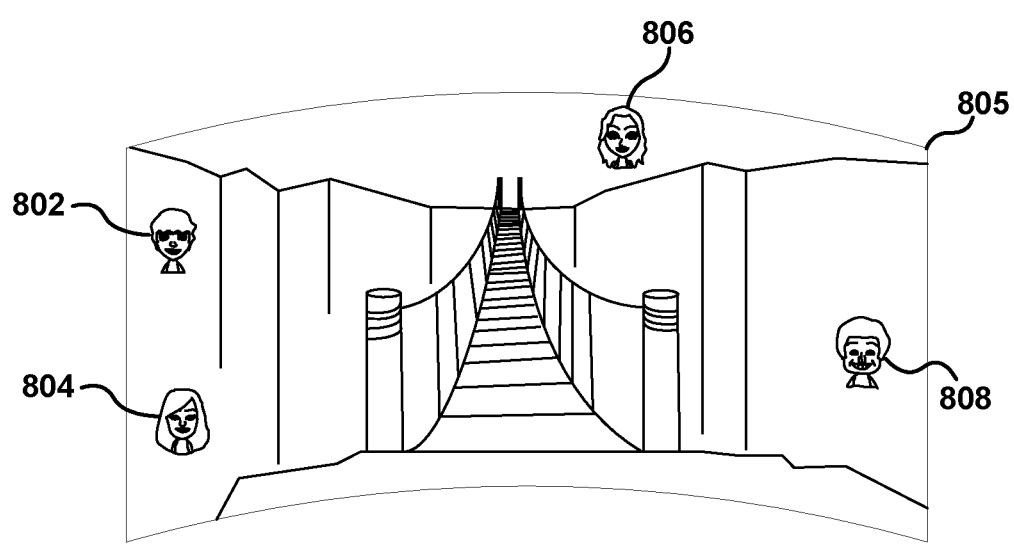

FIGS. 8A-8C show multiple embodiments of spectator feedback content (SFC) as it might appear to an HMD user while navigating a VR scene. For example, in FIG. 8A a VR scene 801 is shown to have SFC in the form of a column of spectator avatars 802, 804, 806, and 808. The same spectators are shown to be arranged in a grid form in VR scene 803 of FIG. 8B and in floating form in VR scene 805 of FIG. 8C.

It should be appreciated that there are a number of permutations and variations of forms for displaying SFC on a display of an HMD that fall within the scope and spirit of the method that have been intentionally excluded from the figures for the sake of clarity. The figures are exemplary embodiments that illustrate how and where spectator feedback content such as spectator avatar may be placed within the VR display. In the exemplary embodiments shown and described in the Figures, an HMD user is enabled to view spectator feedback content via the spectator avatars 802-808 while still allowing the HMD user to concentrate on VR content. According to some embodiments, SFC is placed towards an edge or corner of the display, as shown in FIGS. 8A and 8B, as well as FIG. 1. In certain other embodiments, SFC may be placed on a dedicated SFC display or region of the VR display, such as for example, toward an edge, side, or corner of the HMD user's field of view.

Figure 9A:
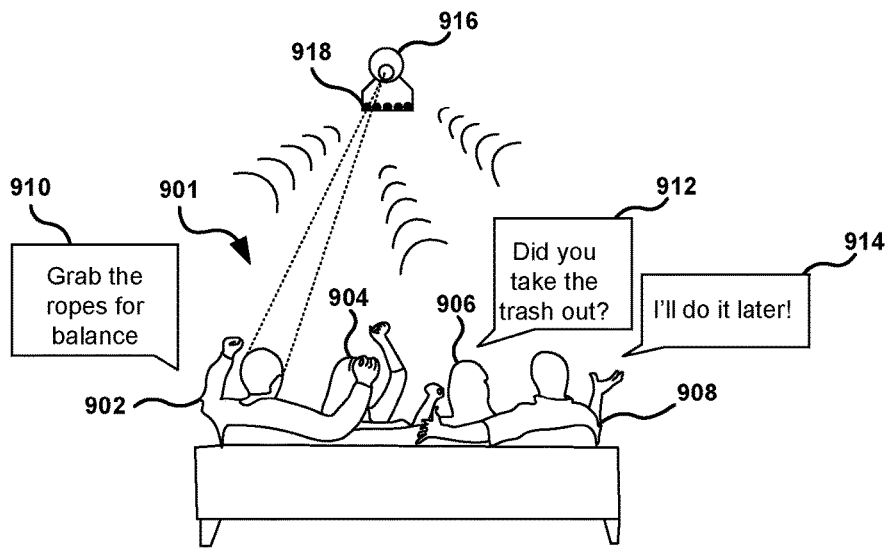
FIGS. 9A-9C show an embodiment of processing SFC and delivering SFC to an HMD user, the SFC including verbal communication.
Figure 9B:
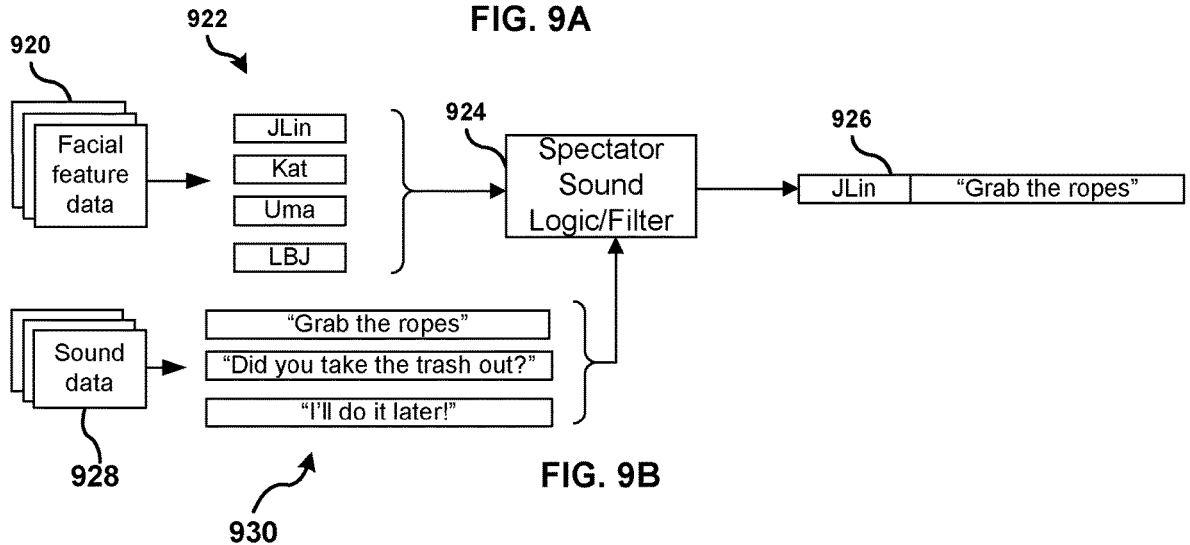
Figure 9C:
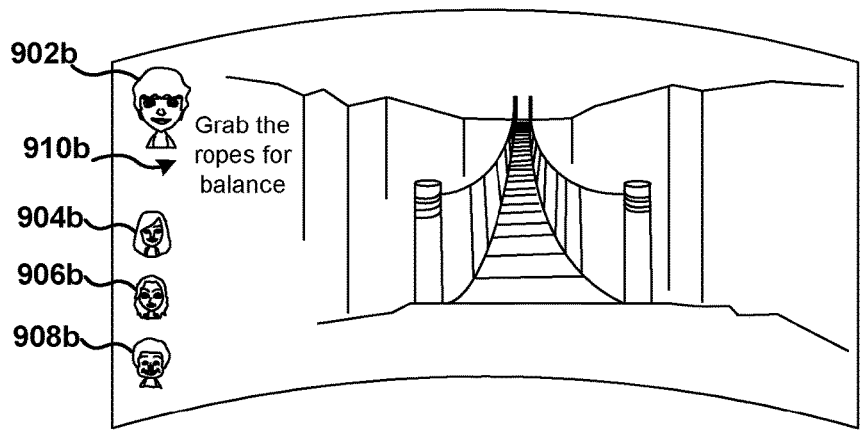

FIGS. 9A-9C show an embodiment of a method for delivering SFC that includes verbal information to an HMD user. FIG. 9A, for example, depicts a social VR interactive space having an audience 901 that includes spectators 902, 904, 906, and 908. According to the embodiment, the spectators 902-908 are observing an HMD user (not shown) interact with VR content, for example via a social screen (not shown). Spectator 902 is shown to suggest to the HMD user to "grab the ropes for balance" verbalization 910. Also shown in the VR interactive space is spectator 906 asking of spectator 908 whether or not he took the trash out, a verbalization 912. Spectator 908 responds that he'll do it later, a verbalization 914. Each of verbalizations 910, 912, and 914 is captured by microphone array 918. Image capture device 916 also captures contents of the social VR interactive space, including identities of spectators 902-908.

FIG. 9B shows an embodiment of a method for parsing sound data 928 (for example, verbalizations 910, 912, and 914 of FIG. 9A) into meaningful expressions 930. Additionally, the embodiment shows facial feature data 920 being analyzed and used to recognize spectator identities 922 corresponding to audience 901. According to this embodiment, spectator identities 922 and expressions 930 are applied to a spectator sound logic/filter 924, which can filter expressions 930 intended to be communicated to HMD user (e.g., verbalization 910) from those which are not (verbalizations 912 and 914). Further, spectator sound logic/filter 924 is also able to match expressions 924 to spectator identities 922. For example, spectator sound logic/filter 924 is able to tag the verbalization 910 "grab the ropes for balance" to spectator 902, JLin. Moreover, the embodiment is able to determine that verbalizations 912 and 914 are not communications intended for the HMD user.

In certain embodiments, spectator sound logic/filter 924 may use voice fingerprinting to match a verbal expression with a spectator who produced the verbal expression. The HMD user may thus be apprised of the expression and the spectator from whom it originated.

Embodiments of methods for matching a sound to a spectator who produced it have been described in a previously filed co-pending U.S. patent application Ser. No. 11/429,133, filed May 6, 2006, entitled "SELECTIVE SOUND SOURCE LISTENING IN CONJUNCTION WITH COMPUTER INTERACTIVE PROCESSING," and is hereby incorporated-by-reference.

According to this embodiment, verbalizations that are not intended to be communicated to HMD user are able to be filtered out. For example, spectator 906 (Uma) is shown in FIG. 9A to ask spectator 908 (LBJ) whether or not he took the trash out 912. Spectator 908 (LBJ) responds that he'll do it later with verbalization 914. Although these verbalizations may be parsed into meaningful expressions 930, they are not delivered to HMD user. Spectator Sound Logic/Filter 924, having semantic interpretation properties, is able to identify that these expressions are not intended for HMD user.

In certain embodiments, the HDM user is given an ability to mute expressions of verbalizations that originate from one or more users. For example, if a particular spectator is distracting the HMD user from interacting with VR content, the HMD user may be allowed to selectively filter out communications from said spectator. The method and system described herein is able to such selective muting of a spectator using spectator sound logic/filter 924. In other embodiments, the user may be enabled to allow all sound data to be communicated to the HMD.

In FIG. 9C, a VR scene is shown to receive SFC containing avatars 902b, 904b, 906b, and 908b corresponding respectively to spectators 902, 904, 906, and 908. Additionally, the SFC contains expression 926 tagged to avatar JLin 902b. In certain embodiments like the one shown, avatar 902b is shown to be relatively larger than the rest of the avatars to better indicate from an originator of the communication. In other embodiments, an audio playback of the recording of the communication may be delivered as part of the SFC to the HMD user. In certain embodiments, only a textual form of the communication is made part of the SFC. In still other embodiments, both textual and audible forms of the expression are made part of the SFC.

Figure 10A:
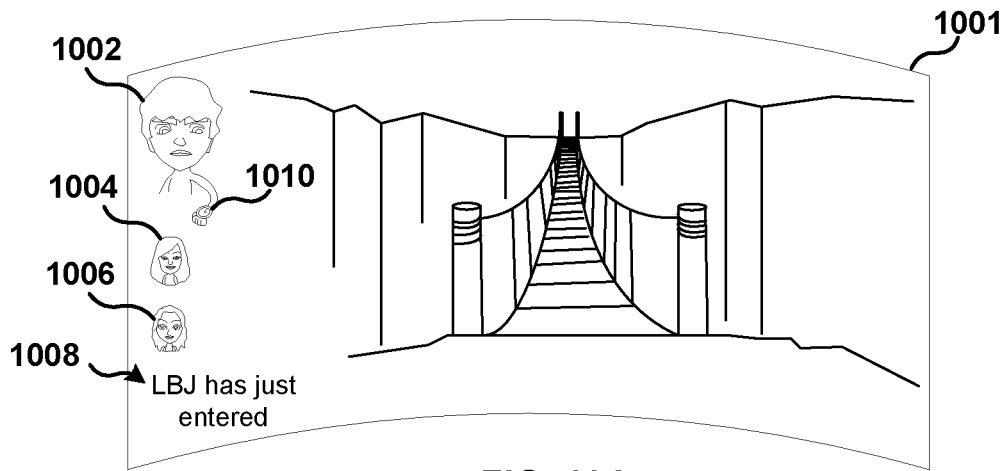
FIGS. 10A-10C show several additional embodiments of delivering SFC to an HMD user's VR scene with respect to spectator states of emotion and/or desire.
Figure 10B:
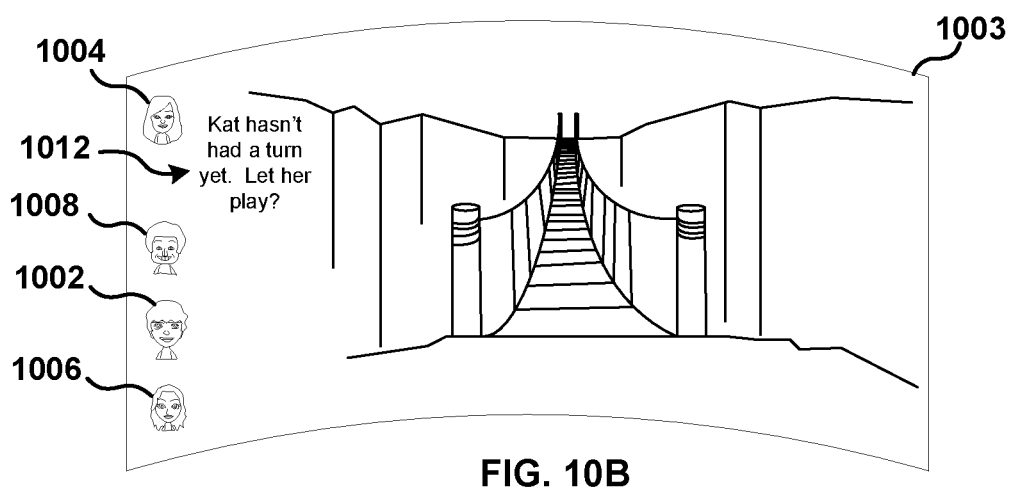
Figure 10C:
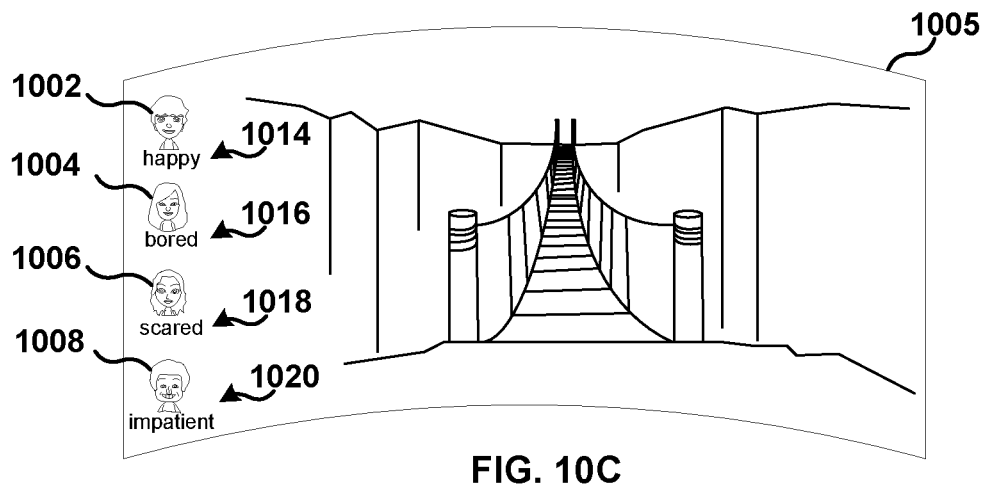

FIGS. 10A-10C show several embodiments of various types of SFC that may be delivered to an HMD user's VR scene. For example, FIG. 10A shows a VR scene 1001 with SFC displayed in a 'column' format on the left-hand side of a display of the HMD. Within the SFC, avatar 1002 appears impatient as he glances at his watch 1010. In certain embodiments, this animation of glancing at one's watch may be representative of a spectator's level of urgency to play. In other embodiments, the animation may correspond to a real life glancing of a watch by spectator 1002. In either case, the HMD user is made aware of the spectator 1002 desire to play. Also shown in VR scene 1001 are avatars 1004 and 1006, who appear neutral, and an indication 1008 that spectator LBJ has just entered the social VR interactive space.

FIG. 10B shows an additional embodiment of a VR scene 1003 with SFC that includes avatars 1002, 1004, 1008, and 1006. In this embodiment, the avatars may be arranged in an order corresponding to which spectator should have a next turn. A determination of which spectator should have a next turn may be determined by a computing system associated with the HMD. In the embodiment shown, avatar 1004 may be displayed at the top of the column of avatars because she has yet to have a turn to play. In addition, the VR system may attempt to inform HMD user that Kat hasn't had a turn to play and ask of the HMD user to let her play 1012.

In FIG. 10C, an additional embodiment of a VR scene 1005 is shown with SFC containing avatars 1002, 1004, 1006, and 1008. In this embodiment, each avatar is shown with an indication of their current emotional state as detected by a system that is enabled with embodiments of the method and system described herein. For example, avatar 1002, 1004, 1006, and 1008 are shown to be happy 1014, bored 1016, scared 1018, and impatient 1020, respectively. The HMD user is thus made aware of these states of his spectators and may take action accordingly. For example, the HMD user when faced with such SFC might choose to give spectator 1008 a next turn with the HMD. In other cases, HMD user may choose to give spectator 1004 a next turn.

Figure 11:
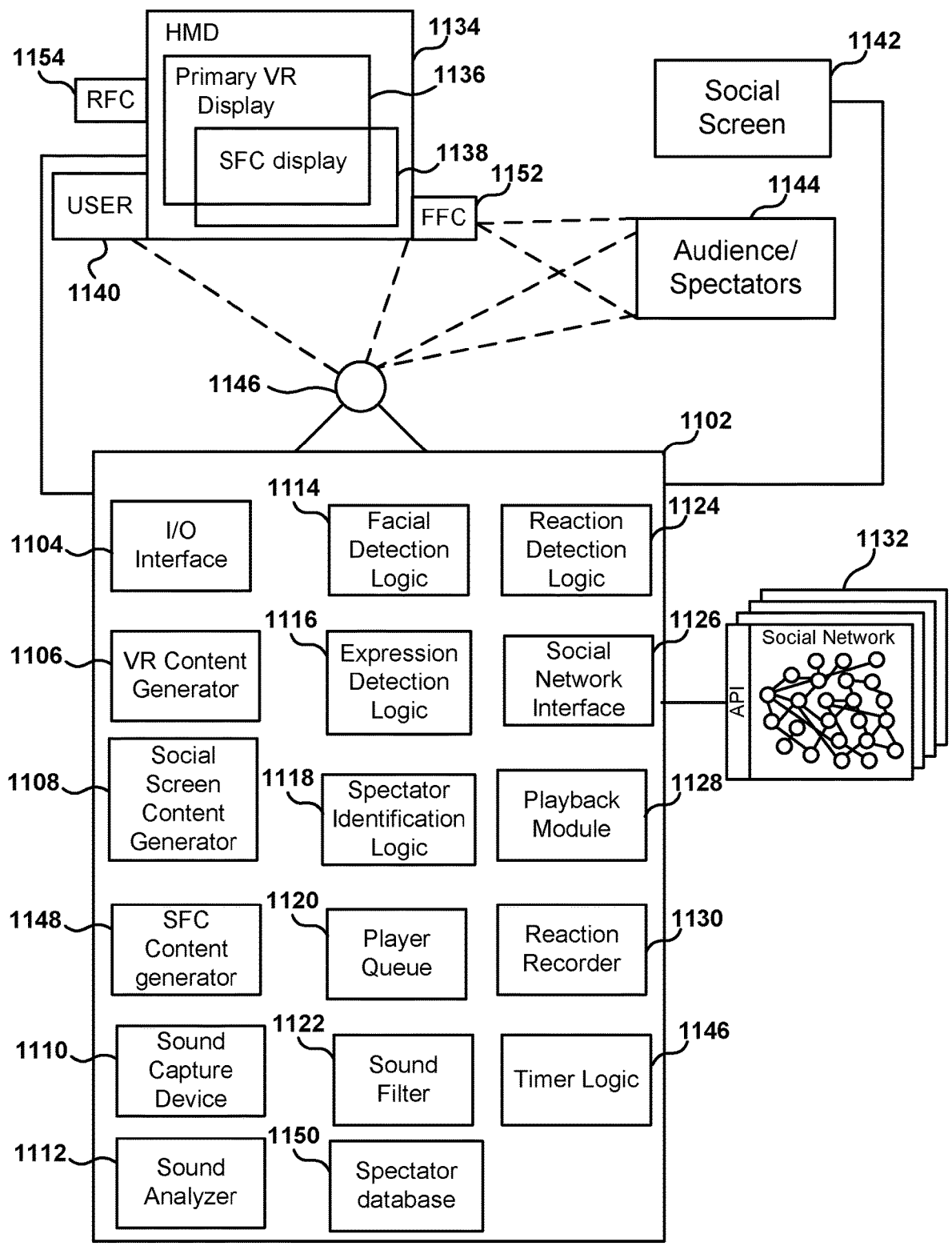
FIG. 11 shows an embodiment of a VR system capable of delivering SFC to a coupled HMD, the VR system having exemplary components usable for processing and delivering SFC.

FIG. 11 shows an exemplary embodiment of a VR system capable of delivering SFC to an HMD user. The VR system includes a computing system or module 1102 having one or more processors as well as a number of hardware and software components. The computing system, for example, is shown to include components I/O interface 1104, VR content generator 1106, social screen generator 1108, microphone 1110, sound analyzer 1112, facial detection logic 1114, expression detection logic 1116, spectator identification logic 1118, player queue 1120, sound filter 1122, reaction detection logic 1124, social network interface 1126, playback module 1128, reaction recorder 1130, and timer logic 1146.

Also shown in FIG. 11 is camera 1146, which captures images from a field of view that includes HMD user 1140 and an audience of spectators 1144. Although shown to be mounted to computing system 1102, camera 1146 may be a standalone unit positioned anywhere within the social VR interactive space while still maintaining a view of HMD user 1140 and audience 1144. Furthermore, although only one camera 1146 is shown for the sake of simplicity, it should be noted that any number of cameras may be implemented in other embodiments in order to capture images from the social VR interactive space, especially in cases where a number of spectators are many and spread about the interactive space.

Also shown to be connected to computing system 1102 is head mounted display (HMD) 1134. HMD 1134 is shown to include primary VR display 1136, SFC display 1138, front-facing camera (FFC) 1152, and rear-facing camera (RFC) 1154. The primary VR display 1136 is responsible for displaying to the HMD user 1140 VR content, while SFC display 1138 delivers spectator feedback content to the HMD 1134. SFC display 1138 is shown to overlap with a portion of primary VR display 1136, demonstrating that SFC 1138 may be able to use some of VR display 1136 to deliver SFC to the HMD 1134. Additionally, SFC display 1138 may have a dedicated space within the HMD 1134 to deliver SFC, according to some embodiments. In other embodiments, the SFC display 1138 is included by the primary VR display 1136.

According to the embodiment shown, FFC 1152 is able to capture images of audience/spectators 1144. Images captured by FFC 1152 may be used for delivery of SFC to the HMD user 1140. The same is true of RFC 1154. For example, if HMD user 1140 wanders too close to a spectator 1144, the SFC content generator 1108 may insert a representation of said spectator 1144 into the SFC display 1138. Further details on using FFC 1152 or RFC 1154 for capturing SFC content will be provided below. Additional components that may be included within the HMD are shown in more detail in FIG. 16. HMD user 1140 is also shown to be connected to HMD 1134.

Although HMD 1134 is shown to be a standalone device connected to computing system 1102, it should be appreciated that whether HMD 1134 is standalone or integrated with computing device 1102 is immaterial to the execution and scope of the method. For example, in some embodiments, HMD 1134 may have a slot or mount for computing device 1102, which may be allow for computing device 1102 to be attached to and detached from HMD 1134 freely. In still other embodiments, HMD 1134 may be a standalone device that is connected to computing system 1102 either via wire or wirelessly. Additionally, there are certain embodiments in of the method and system in which the primary VR display 1136 and the SFC display 1138 are associated with the computing device 1102, which is in turn associated with the HMD 1134. In these and other embodiments, the HMD 1134 may act as a holder or assembly for a separable computing system 1102 that is associated with a display including the primary VR display 1136 and the SFC display 1138.

Included within certain embodiments of computing system 1102 are VR content generator 1106 and social screen content generator 1106. VR content generator 1106 is generally responsible for processing operations for delivering VR content to the HMD 1134. Social screen content generator 1108 is generally responsible for providing a view of the HMD user's experience to a secondary display such as a social screen 1142. In certain embodiments, the social screen content generator 1108 renders a 2-dimensional version of the VR scene to be displayed on social screen 1142. Methods for rendering 2-dimensional projections or versions of 3-dimensional content is well described in the art and will not be described in detail here.

Also shown to be included in computing system 1102 are facial detection and expression detection logics 1114 and 1116, respectively. Facial detection logic 1114 uses facial recognition technology to identify who a spectator is. For example, if a spectator leaves the room, facial detection logic 1114 is configured to recognize who left the room. If the same spectator re-enters the room, facial detection logic 1114 is able to recognize that the same person who left the room has come back. The computing system 1102 is able to use facial detection logic 1114 to inform the HMD user 1140 that the spectator who has entered the social VR interactive space was the same spectator who had left as opposed to, for example, a new spectator.

If it were the case that a new spectator has entered the room, facial detection logic 1114 is configured to recognize that a new spectator has entered the social VR interactive space and inform HMD user 1140 of the same. In some embodiments, facial detection logic 1114 communicates with spectator database 1150, which creates a store of individual spectator profiles. In other embodiments, facial detection logic 1114 communicates with spectator identification logic 1118, which uses facial recognition capabilities of facial detection logic 1114 to keep track of spectators. In addition, spectator identification logic 1118 may also be configured to communicate with spectator database 1150 to determine that a given spectator has a profile associate with him in the database 1150.

Spectator database 1150, in some embodiments, may store a number of types of information regarding each spectator. For example, database 1150 may store facial feature data of a spectator so that facial detection logic 1114 and spectator detection logic 1118 may make a positive identification of a spectator with a spectator profile. Within each spectator profile, a spectator's preferences, and/or tendencies, and/or behavioral patterns may be stored. For example, a first spectator may be more patient than a second spectator. Data capturing this difference may be stored and used in SFC content generator 1148.

In addition to facial detection logic 1114, which may determine the identity of a spectator, expression detection logic 1116 is operable to detect an emotional state of a spectator based on his facial expressions. For example, expression detection logic 1116 may analyze a number of facial characteristics of a spectator such as eye movement, rate of eye blink, head position, pupil dilation, shape of mouth, etc. From such facial characteristic data, one or more emotional state may be extrapolated. Emotional state data provided by expression detection logic 1116 may also be used by SFC content generator 1148 for providing the HMD user 1140 with information regarding a state of a spectator.

Reaction detection logic 1124, in some embodiments, may detect facial features indicative of discrete types of reactions, such as surprise, humor, fear, worry, excitement, awe, etc. Reaction detection logic 1124 communicates with reaction recorder 1130, which is configured to record a live video of spectator reaction when reaction detection logic determines that a particular intensity or type of reaction is occurring. Reaction recorder 1128 receives a video stream from camera 1146 but does not necessarily record or store spectator video at all times. For example, in some embodiments, the VR content may be such that audience reaction is not so frequent. In such embodiments, the reaction detection logic 1124 may decide only to record when a level of reaction reaches a certain threshold. That is, audience reactions which are noteworthy or worth sharing are able to be detected by reaction detection logic 1124 and recorded and saved by reaction recorder 1130. In other embodiments, audience reaction may be constantly recorded and saved.

In general, an audience reaction recording is tagged or affixed to a corresponding segment of VR content which is being reacted to. In certain embodiments, playback module 1128 synchronizes the two clips such a third party who watches the two clips playing simultaneously will be provided with a segment of VR content along with a clip of audience reaction to the VR content in real time. For example, if there is a recorded clip of VR content that happens to be funny and a corresponding clip of an audience's laughing reactions, the two may be synchronized as if the audience were reacting in real time to the funny VR content by playback module 1128. Together, the VR content clip and the audience reaction clip may be called social interactive VR content. Playback module 1128 is also configured to receive playback request from the HMD user or a remote client device and deliver playback content to the HMD user or remote client device.

In certain embodiments, playback module 1228 also interfaces with a social network interface 1126, which is itself interfaced with one or more application programming interfaces (API's) of one or more social networks 1132. The social networks 1132 may, for example, support playback the social interactive VR content. Additionally, HMD user reaction maybe included in the social interactive VR content. For example, cameras facing the HMD user may record the user's movement in response to VR content. Microphones may also record the HMD user's verbal reaction to VR. Both of such reactions may be enjoined to the social interactive VR content and made shareable through the internet via playback module 1128 and social network interface 1126.

Also shown to be included in computing system 1102 are sound capture device 1110, sound analyzer 1112, and sound filter 1122. These components, in certain embodiments, are responsible for capturing audible forms of SFC to be used by SFC content generator 1148. For example, sound capture device 1110 is configured to detect that a spectator is communicating with the HMD user 1140 and sound analyzer 1112 is configured to parse sound data into meaningful expressions.

In certain embodiments, sound filter 1122 is configured to separate expressions intended to be communicated to HMD user 1140 from sounds and expressions not intended to be communicated to the HMD user 1140. According to these embodiments, the HMD user 1140 is provided only with pertinent SFC and sounds not helpful or informative to the HMD user 1140 may otherwise be filtered out.

In certain other embodiments, HMD user 1140 may decide to selectively block communications of one or more spectators if they are unproductive or distracting, for example. HMD user 1140 may do so via sound filter 1122, wherein the filter may detect a source of each communication and selectively block those of the particular spectator whose comments are not wanted. Sound filter 1122 is able to do so in some embodiments by using voice recognition and/or 3-dimensional sound sourcing. For example, in certain embodiments, sound filter 1122 can recognize that a sound is from a spectator whose comments are not welcome and specifically filter them out. In other embodiments, sound filter 1122 is able to receive data regarding a position or location of a source of sound and cross reference the source of sound to a detected identity of a person by facial detection logic 1114 and spectator identification logic 1118.

Also shown to be included in computing system 1102 are player queue 1120 and timer logic 1146. According to certain embodiments, player queue 1120 is configured to keep track of a queue of spectators for deciding who gets to have a next turn on the HMD. For example, if there are four spectators waiting to have a turn, the player queue 1120 will place each spectator in a queue based on the relative time each player has waited for a turn and/or an amount of time that spectator has taken previous turns on the HMD.

In some embodiments, player queue 1120 communicates with timer logic 1146, which may record an amount of time each spectator has waited for a turn. Additionally, timer logic 1146 may also record an amount of time an HMD user has spent using the HMD. Player queue 1120 and timer logic 1146 may be used by SFC content generator 1148 for informing HMD user 1140 of a player queue or a time that a spectator has waited for a turn on the HMD.

Also shown to be included in computing system 1102 is spectator feedback content (SFC) generator 1148. SFC generator 1148, in general, is responsible for producing content regarding a state of one or spectators of an audience 1144 and delivering it to the SFC display 1138 of HMD 1134. In some embodiments, SFC generator collects data from various components included in computing system 1102 and creates content viewable for HMD user 1140. For example, SFC generator 1148 may collect data from facial detection logic 1114, expression detection logic 1116, and spectator identification logic 1118 to render a series of avatars representing the audience/spectators 1144. In some embodiments, SFC generator 1148 is able to use a same avatar for recurring spectators whom are recognized by facial detection logic 1114. In other embodiments, spectators are given an opportunity to select and customize their own avatars.

SFC generator 1148 may also be configured to take expression detection logic 1116 data and spectator identification logic 1118 to map spectator facial expression to respective avatars. SFC generator 1148 may also collect data from sound capture device 1110, sound analyzer 1112, and sound filter 1122 to deliver verbal feedback of spectators to the HMD user 1140. Additionally, SFC content generator 1148 may also be configured to attribute SFC to non-player characters in addition to or instead of avatars.

In general SFC generator 1148 communicates with VR content generator 1106 to determine a most effective format and way of delivering SFC to the HMD user 1140. For example, if SFC generator 1148 determines that HMD user 1140 should not be alerted of something, then it may decide to deliver SFC in an unobtrusive location within the VR display. If, on the other hand, SFC generator 1148 determines that HMD user 1140 should be made aware of some state of a spectator, it may then decide to deliver SFC or a portion thereof at a purposefully obtrusive or otherwise noticeable location within the VR display.

Figure 12A:
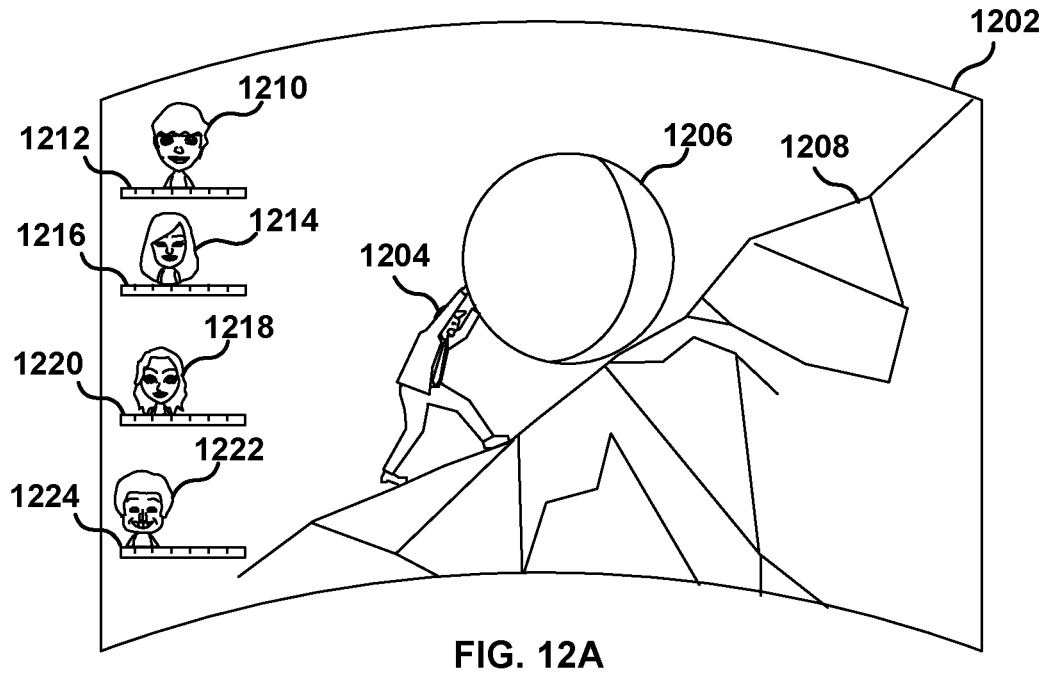
FIGS. 12A and 12B show embodiments of delivering SFC to an HMD user with respect to an amount of time a current HMD user has occupied the HMD and an amount of time each spectator has been waiting for a turn to use the HMD.
Figure 12B:
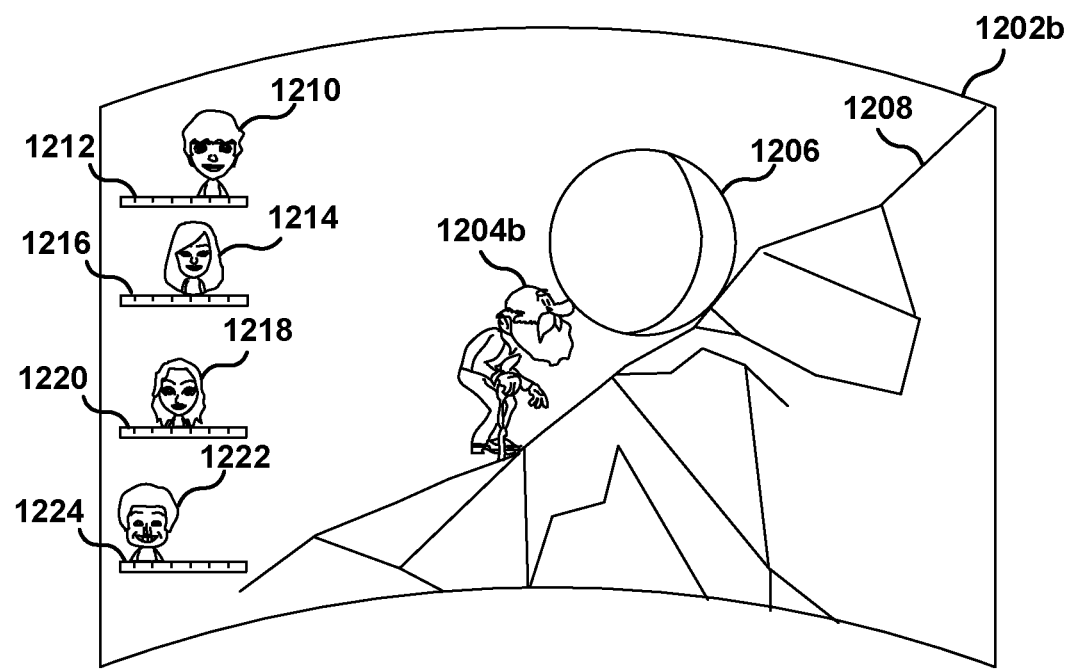

FIGS. 12A and 12B show additional embodiments for delivering SFC to a VR scene with respect to an audience of spectators and an amount of time they have been waiting to have a turn. In VR scenes 1202 and 1202b, an HMD user 1204 is shown to pushing a ball 1206 up a mountain 1208 in a game of 'Sisyphus.' SFC is also shown to be delivered to the VR scene. For example, avatars 1210, 1214, 1218, and 1222 are shown to be progressing along timer bars 1212, 1216, 1220, and 1224, respectively. In certain embodiments, avatars that have moved the farthest along a timer bar are the ones who have waited the longest. For example, spectator 1210 is shown to have moved along time bar 1212 farther than the rest of the spectators 1214, 1218, and 1222, and as a result may be displayed at the top of the SFC display.

As more time passes, each avatar 1210, 1214, 1218, and 1222 is shown to have progressed along time bars 1212, 1216, 1220, and 1224, respectively. HMD user is thus made aware of how long each spectator has waited for a turn by each avatar's relative progress along their respective time bars. In the embodiment shown, an additional indication of the amount of time the HMD user has been playing is shown in the form of an aging HMD user avatar 1204b.

Figure 13A:
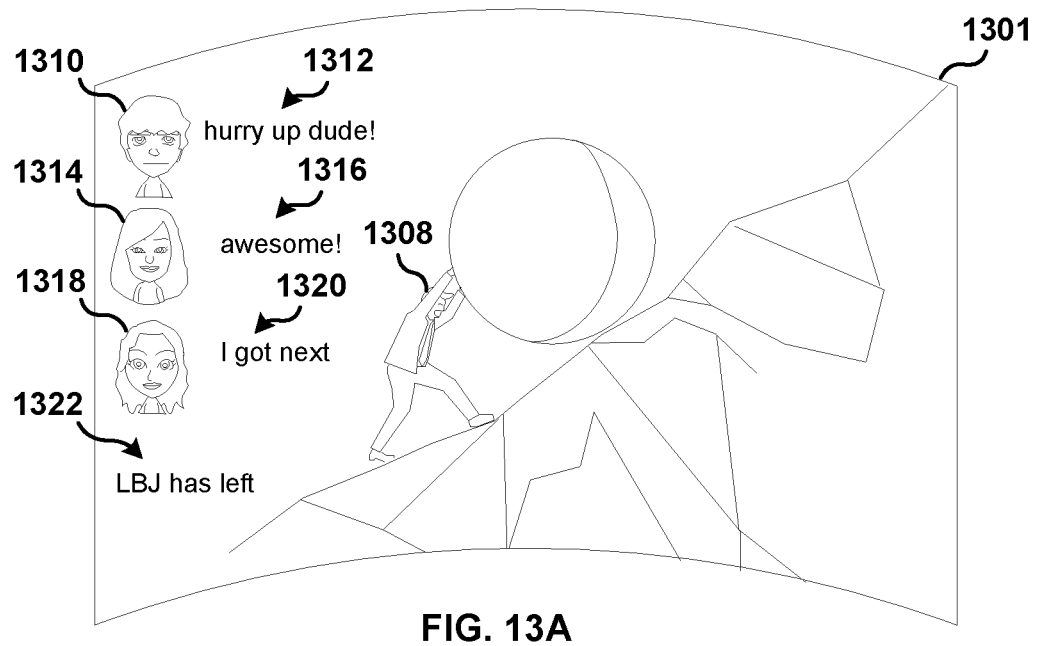
FIGS. 13A and 13B show embodiments of delivering SFC to an HMD user with respect a communication made by a spectator and a facial expression made by a spectator.
Figure 13B:
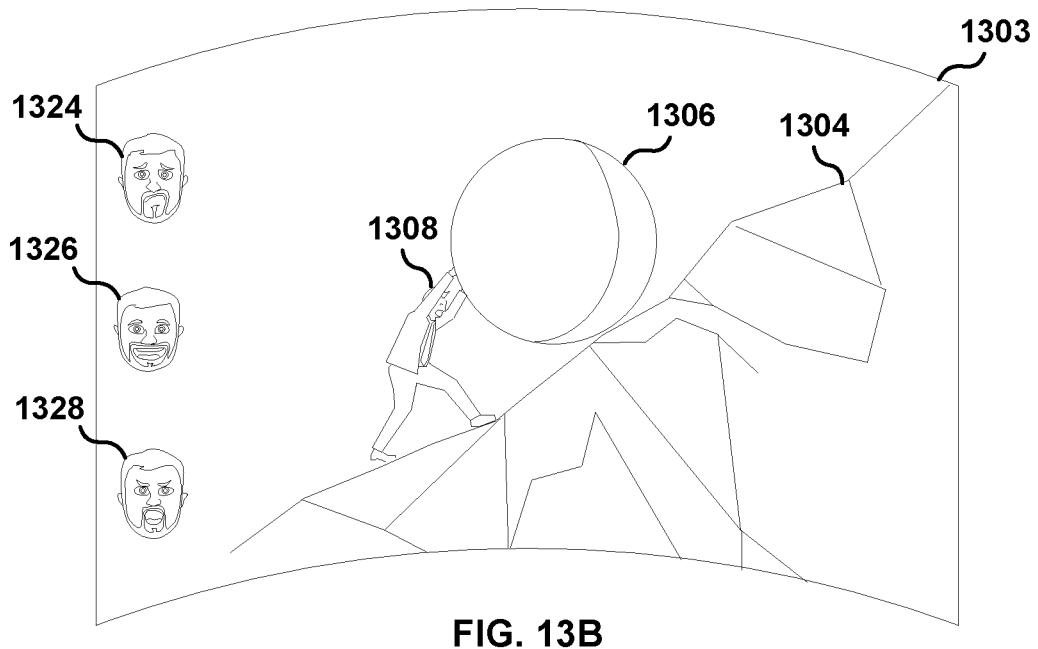

Additional embodiments for delivering SFC are shown in FIGS. 13A and 13B. For example, in VR scene 1301 avatars 1310, 1314, and 1318 are shown to be presented as SFC within the VR scene. Avatar 1310 is shown to not be especially happy in his expression. Also attributed to avatar 1310 is the expression/communication to "hurry up dude!" HMD user 1308 is thus made aware that spectator/avatar 1310 is impatient and would like for him to hurry up. Avatar 1314, on the other hand, is shown to be pleased both facial-expressively and verbally 1316. Spectator/avatar 1318, although shown facial expressively to be not be displeased is however shown to be eager to have a turn next 1320. Also shown in VR scene 1301 is an indication that a fourth spectator, LBJ, has left the social VR interactive space. The HMD user is thus made aware of several states of his spectators with respect to how they feel and their eagerness to have a turn.

FIG. 13B shows an additional embodiment of delivering SFC to a VR scene 1303. In the embodiment shown, real life or life-like representations 1324, 1326, and 1328 of a spectator is shown. Representation 1324 shows the spectator to be pouting, while representation 1326 shows the spectator to be excited, and representation 1328 shows spectator to be angry and/or frustrated. As a result, according to this embodiment, the HMD user is apprised of not just data on a state of a spectator, but a qualitative, life-like display of the spectator's emotional and/or expressive state.

Figure 14A:
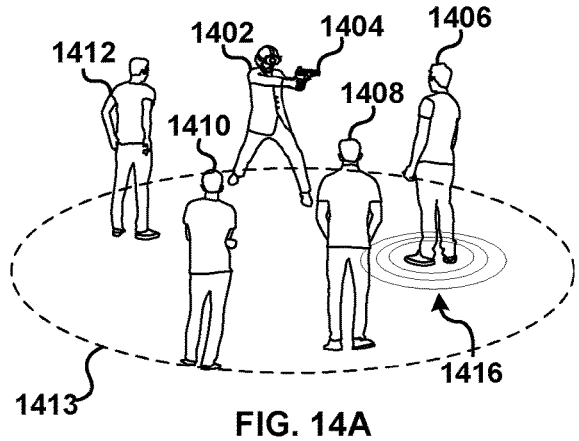
Figure 14B:
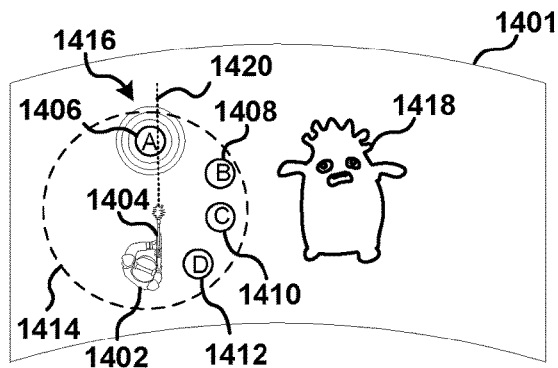

FIGS. 14A through 14F show a method of delivering SFC 1414 to VR scenes 1401, 1403, and 1405 of an HMD user 1402 in response to a personal space of a spectator being encroached on. FIG. 14A, for example, shows HMD user 1402 interacting with a VR scene 1401 with a shooting device 1404. Spectators 1406, 1408, 1410, and 1412 are shown to be watching HMD user 1402 within a social VR interactive space 1413. HMD user 1402 is shown to be pointing shooting device in a direction of spectator 1406, which is according to some embodiments a way of encroaching on someone's personal space. In corresponding FIG. 14B, a VR scene 1401 is shown to include a monster 1418 which the HMD user 1402 is targeting. Also shown within the VR scene is SFC 1414, which may in certain embodiments be a birds-eye-view (BEV) (or other overhead view) of HMD user 1402 and spectators 1406, 1408, 1410, and 1412. Spectators in BEV-SFC 1414 are shown as lettered circles A, B, C, and D, respectively.

In certain embodiments of the BEV-SFC, spectator position relative to the HMD user is proportional to a real world position of the spectator in the social VR interactive space 1413. Also shown in BEV-SFC 1414 is a representation of the shooting device 1404 as well as a virtual line of shot 1420 to indicate what direction and into what the HMD user 1402 may be pointing at. As shown in FIG. 14A, HMD user 1402 is pointing shooting device 1404 at spectator 1406, thereby encroaching on a personal space of the spectator 1406. An indication 1416 that the personal space of spectator 1406 is being encroached by HMD user 1402 is shown in BEV-SFC 1414 in the form of highlighted and/or pulsating rings around spectator 1406's virtual representation.

Figure 14C:
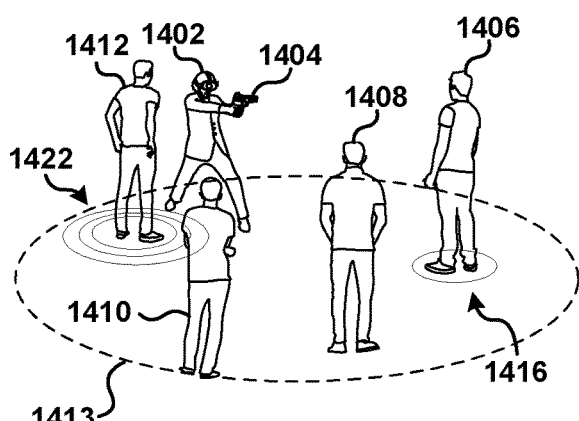
Figure 14D:
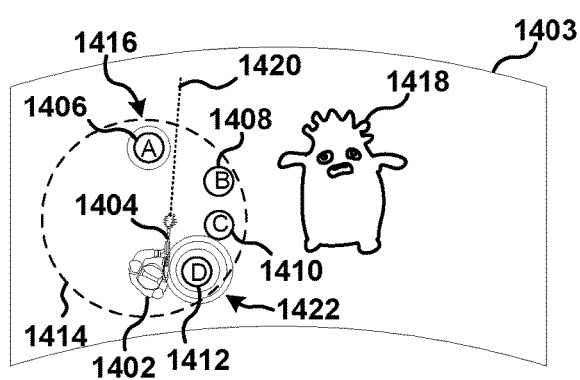

In FIG. 14C, HMD user 1402 is shown to have realized that he is pointing shooting device 1404 at a spectator and proceeds to adjust his position. HMD user 1402 is shown to have moved toward his right hand side such that his line of shot 1420 no longer coincides with spectator 1406's personal space. As a result, the indication 1416 that spectator 1406's personal space is being encroached is lessened.

However, by moving, HMD user 1402 has unwittingly moved into spectator 1412's personal space 1422. BEV-SFC 1414 indicates as much by highlighting spectator 1412's virtual representation with pulsating rings indication 1422.

It should be noted that while indications 1416 and 1422 are shown to be pulsating rings that alert HMD user 1402 that one or more personal spaces are being encroached on, indications 1416 and 1422 may take one of several forms, including an audible warning, visual or audible instructions for repositioning, or any combination thereof.

Figure 14E:
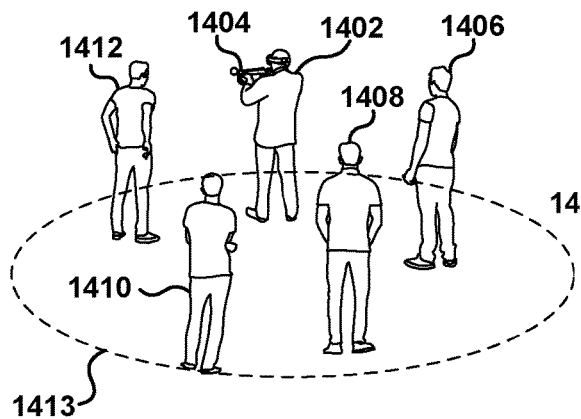
Figure 14F:
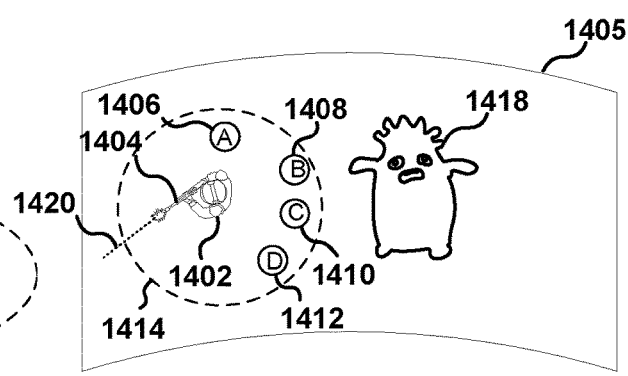

In FIGS. 14E and 14F, HMD user 1404 is shown to have repositioned and/or reoriented himself such that line of shot 1420 is no longer in a direction facing spectators 1406, 1408, 1410, and 1412. As a result, indications 1416 and 1422 are no longer presented in BEV-SFC 1414 of VR scene 1405. In certain embodiments, the VR content generator may reposition the HMD user 1402 by providing visual and/or verbal instructions. In addition, it may pause or slow the VR content and reposition VR content to correspond with a new position and/or orientation of HMD user 1402. For example, while HMD user 1402 is turning away from the audience to a new orientation, target monster 1418 is repositioned accordingly.

In certain other embodiments, a target such as monster 1418 may be selectively moved, shifted, or repositioned to reposition and/or reorient HMD user 1402 away from a state of encroaching a personal space of a spectator. For example, a VR content generator may selectively move a target away from a direction facing a spectator if it is determined that a personal space of a spectator is being encroached on. As a result, the HMD user 1402 is provided with an opportunity to disengage from a state of encroachment of a personal space of a spectator without disengaging from VR content. The HMD user 1402 may not even realize that he is being directed away from a state of encroachment as the VR content generator seamlessly redirects his position and orientation away from personal spaces of an audience.

Figure 15A:
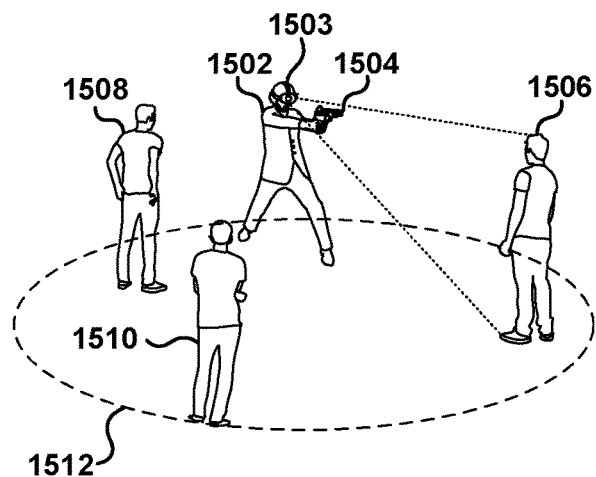
Figure 15B:
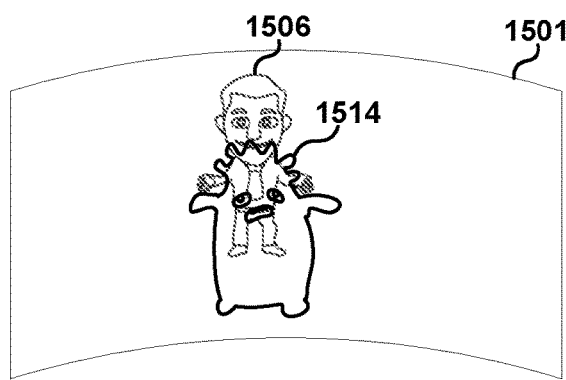

FIGS. 15A-15D show additional embodiments for delivering SFC to a VR scene 1501. In FIG. 15A, for example, an HMD user 1502 is shown to be interacting with VR content via a shooting device 1504. Spectators 1506, 1508, and 1510 are also shown to be within the social VR interactive space 1512. Much like in FIG. 14A, HMD user 1502 is pointing shooting device 1504 in a direction of a spectator 1506. However, instead of displaying a BEV-SFC in VR scene 1501, a real world image or representation of spectator 1506 is superimposed or inserted into VR scene 1501 of FIG. 15B. According to this embodiment, the real world image or representation of spectator 1506 is shown to be captured by a FFC 1503.

In this embodiment, for example, target monster 1514 is shown in the foreground while a real world representation of spectator 1506 is shown in the background. Real world representation of spectator 1506 is also shown to have an expression that is neutral. Additionally, real world representation of spectator 1506 is shown to have a position and orientation within the VR scene 1501 that corresponds to the spectator 1506's real world position and orientation. For example, the closer a spectator 1506 is to HMD user 1502, the larger the spectator's real world representation will appear within VR scene 1501.

Figure 15C:
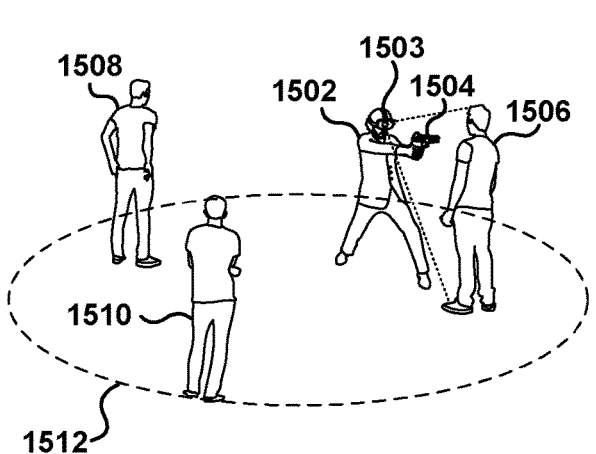
Figure 15D:
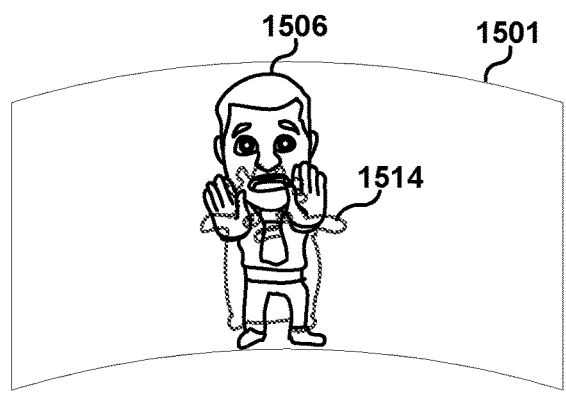

In FIG. 15C, HMD user 1502 is shown to have moved closer to spectator 1506. In certain embodiments, having HMD user 1502 within a certain distance of a spectator indicates that the spectator's personal space is being encroached. This is especially the case if HMD user 1502 is wielding a pointing and/or shooting device or controller. As a result, real world representation 1506 becomes more prominent and it is moved to the foreground. HMD user 1502 is thus given an opportunity to assess a position and orientation of spectator 1506 based on an a way spectator 1506's real world representation appears within 1501. For example, in VR scene 1501, spectator 1506's real world representation appears to HMD user 1502 to be very close. In addition, according to this embodiment, an expression of discomfort of spectator 1506 is also shown to be present in the spectator's real world representation.

Figure 16:
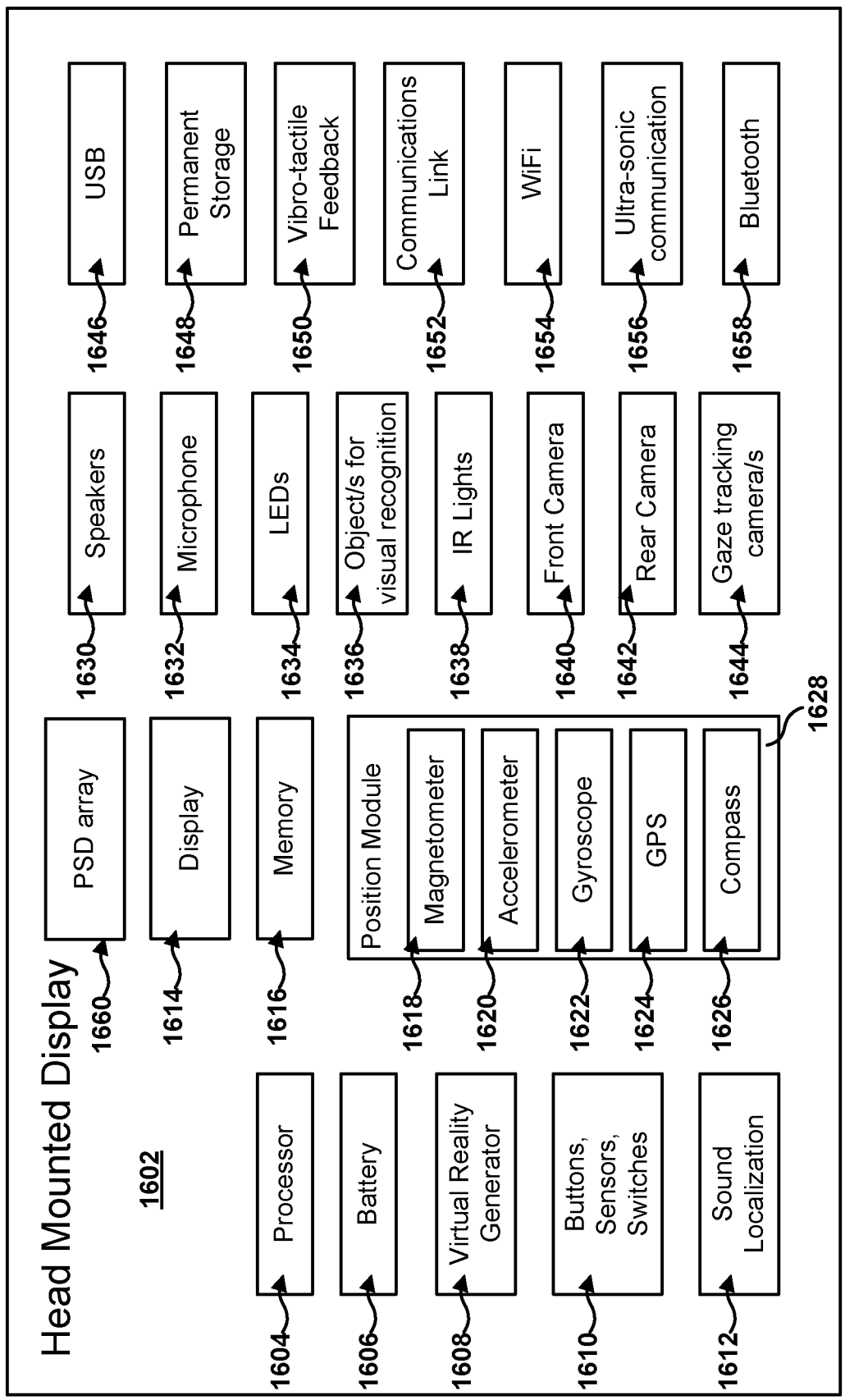
FIG. 16 shows an embodiment of an HMD capable of receiving and displaying SFC.

FIG. 16 illustrates an additional embodiment of an HMD 1602 that may be used with the presented method and/or system. HMD 1602 includes hardware such as a processor 1604, battery 1606, virtual reality generator 1608, buttons, sensors, switches 1610, sound localization 1612, display 1614, and memory 1616. HMD 1602 is also shown to include a position module 1628 that comprises a magnetometer 1618, an accelerometer 1620, a gyroscope 1622, a GPS 1624, and a compass 1626. Further included on HMD 102 are speakers 1630, microphone 1632, LEDs 1634, object/s for visual recognition 1636, IR lights 1638, front camera 1640, rear camera 1642, gaze tracking camera/s 1644, USB 1646, permanent storage 1648, vibro-tactile feedback 1650, communications link 1652, WiFi 1654, ultra-sonic communication 1656, Bluetooth 1658, and photo-sensitive diode (PSD) array 1660.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the changing of VR operations are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method using a processor for processing operations for delivering spectator feedback content to a head mounted display (HMD) of an HMD user, comprising:

providing a virtual reality (VR) scene to the HMD of the HMD user;

capturing images, using one or more cameras, of one or more spectators present in a real-world environment of the HMD user, the images usable to detect a presence of one or more spectators and facial feature states descriptive of emotion of the one or more spectators;

providing for display within the VR scene one or more avatars respective of the one or more spectators, the one or more avatars having virtual facial features; and updating graphics of the virtual facial features of the one or more avatars to correspond respectively to the facial feature states descriptive of emotion as detected of the one or more spectators present in the real-world environment of the HMD user, wherein images of the one or more avatars are superimposed into the VR scene for viewing on the HMD by the HMD user, and the detected emotions of the one or more spectators is rendered by the one or more avatars based on the updating, such that the detected emotions function to visually communicate said spectator feedback content to the HMD user while the HMD user is interacting with the VR scene.

2. The computer-implemented method of claim 1, further comprising:

continually updating the virtual facial features of the one or more avatars to correspond respectively newly detected facial feature states descriptive of emotion of the one or more spectators.

3. The computer-implemented method of claim 1, wherein the one or more avatars are overlaid to cover a portion of the VR scene such that the one or more avatars are external to a VR interaction space the HMD user interacts with.

4. The computer-implemented method of claim 1, further comprising:

tracking an amount of time the one or more spectators have been waiting; and providing, to the HMD for display within the VR scene, a representation of the amount of time the one or more spectators have been waiting.

5. The computer-implemented method of claim 1, further comprising:

providing, to the HMD for display within the VR scene, a player avatar within the VR scene, the player avatar representing the HMD user;

tracking an amount of time the HMD user has been using the HMD; and providing, to the HMD for display within the VR scene, a representation of the amount of time the HMD user has been using the HMD, the representation including updating a game age of the player avatar.

6. The computer-implemented method of claim 1, further comprising:

capturing sound data of the one or more spectators, the sound data usable to determine that a spectator is providing a communication to the HMD user;

processing the sound data for identifying the spectator providing the communication to the HMD user; and delivering, to the HMD, a representation of the communication, the representation indicating the spectator who provided the communication to the HMD user.

7. A computer-implemented method using a processor for processing operations for delivering information on a positional state of one or more spectators relative to a head mounted display (HMD) of a HMD user, comprising:

providing a VR scene to the HMD of the HMD user;

obtaining positional data on the one or more spectators present in a real world setting along with the HMD user using a camera, the positional data usable to determine a location of the one or more spectators relative to the HMD user in the real world setting; and generating for the HMD, for display within the VR scene, an overhead view of the real world setting, the overhead view including a first indication of the location of the one or more spectators relative to the HMD;

wherein the overhead view provides an identification of encroachment by the HMD user of a personal space of the one or more spectators, and said identification includes an alert for the HMD user of said encroachment.

8. The computer-implemented method of claim 7, wherein the overhead view includes a bird's-eye-view.

9. The computer-implemented method of claim 7, further comprising:

detecting, within the VR scene, that one or more points of interest within the VR scene are in a direction or proximity that corresponds to the personal space of the spectator in the real world setting; and moving, within the VR scene, at least one of the one or more points of interest of the VR scene to a different location within the VR scene, the different location not being in the direction or proximity that corresponds to the personal space of the spectator in the real world setting, wherein said moving at least one of the one or more points of interest enable the HMD user to discontinue from encroaching the personal space of the spectator while still being able to continue to interact with the VR scene.

10. The computer-implemented method of claim 9, wherein the second indication that the personal space of a spectator is being encroached includes an audible alert.

11. The computer-implemented method of claim 9, wherein the second indication includes an animation, the animation being within the overhead view of the VR scene.

12. The computer-implemented method of claim 9, further comprising:

providing, to the HMD for presentation within the VR scene, instruction for repositioning, the instruction for reposition including a visual or audible prompt indicating how the HMD user is to move in order to discontinue from encroaching on the personal space of the spectator.

13. A computer-implemented method using a processor for processing operations for delivering information on a positional state of one or more spectators relative to a head mounted display (HMD) of a HMD user, comprising:

providing a VR scene to the HMD of the HMD user;

obtaining, using one or more cameras, captured images of a real world setting, the captured images being analyzed to identify positional data on the one or more spectators present in the real world setting along with the HMD user, the positional data usable to determine locations of the one or more spectators relative to the HMD user in the real world setting;

determining, based on the positional data, that a personal space of a spectator is being encroached;

generating for display, within the VR scene, a representation of the spectator whose personal space is being encroached; and providing, to the HMD for display within the VR scene, instruction for repositioning to avoid further encroaching on the personal space of the spectator.

14. The computer-implemented method of claim 13, wherein the representation is based on images captured of the spectator.

15. The computer-implemented method of claim 13, wherein the representation is displayed at a display location within the VR scene that corresponds to a real world location of the spectator.

16. The computer-implemented method of claim 13, wherein the images captured of the spectator are at least partially obtained by one or more front facing cameras on the HMD.

17. The computer-implemented method of claim 13, further comprising:
   providing, to the HMD for presentation, instructions for producing an audible alert when it is determined that a personal space of a spectator is being encroached.

18. The computer-implemented method of claim 13, further comprising:
   detecting, within the VR scene, that one or more points of interest of the HMD user within the VR scene have a first display location that corresponds to the personal space of the spectator; and
   moving, within the VR scene, at least one of the one or more points of interest within the VR scene to a second display location within the VR scene, the second display location not corresponding to the personal space of the spectator.

* * * * *